(12) United States Patent
Anzai et al.

(10) Patent No.: US 7,100,923 B2
(45) Date of Patent: Sep. 5, 2006

(54) MAGNETIC FLUID SEAL DEVICE

(75) Inventors: Hiroshi Anzai, Fujisawa (JP); Takao Kanno, Fujisawa (JP); Yoshimi Imamoto, Fujisawa (JP)

(73) Assignee: NOK Corporation, Tokyo (JP)

( * ) Notice: Subject to any disclaimer, the term of this patent is extended or adjusted under 35 U.S.C. 154(b) by 165 days.

(21) Appl. No.: 10/477,760

(22) PCT Filed: May 22, 2002

(86) PCT No.: PCT/JP02/04938

§ 371 (c)(1),
(2), (4) Date: Apr. 13, 2004

(87) PCT Pub. No.: WO02/095271

PCT Pub. Date: Nov. 28, 2002

(65) Prior Publication Data

US 2004/0262846 A1    Dec. 30, 2004

(30) Foreign Application Priority Data

May 22, 2001    (JP)    ............................. 2001-152418

(51) Int. Cl.
*F16J 15/43*    (2006.01)
(52) U.S. Cl. .................................................... 277/410
(58) Field of Classification Search ................ 277/410, 277/302
See application file for complete search history.

(56) References Cited

U.S. PATENT DOCUMENTS

| | | | | |
|---|---|---|---|---|
| 2,834,618 A | * | 5/1958 | Wiltse | ........................ 277/428 |
| 4,293,137 A | * | 10/1981 | Ezekiel | ........................ 277/410 |
| 4,506,895 A | * | 3/1985 | Raj | .............................. 277/302 |
| 4,708,350 A | * | 11/1987 | Mizumoto et al. | .......... 277/410 |
| 4,817,964 A | * | 4/1989 | Black, Jr. | .................... 277/410 |
| 5,137,286 A | * | 8/1992 | Whitford | .................... 277/410 |
| 5,271,631 A | * | 12/1993 | Yokouchi et al. | ........... 277/410 |

FOREIGN PATENT DOCUMENTS

| | | | |
|---|---|---|---|
| JP | 59-123754 | | 8/1984 |
| JP | 60-049169 | | 3/1985 |
| JP | 60-155066 | | 8/1985 |
| JP | 63-125867 | | 5/1988 |
| JP | 1-234663 | * | 9/1989 |
| JP | 5-086977 | | 4/1993 |
| JP | 5-263829 | | 10/1993 |
| JP | 5-86034 | | 11/1993 |
| JP | 7-077282 | | 3/1995 |
| JP | 7-305777 | | 11/1995 |
| JP | 8-240222 | | 9/1996 |
| JP | 11-062526 | | 3/1999 |
| JP | 11-141561 | | 5/1999 |
| WO | WO 90/00234 | * | 1/1990 |

* cited by examiner

*Primary Examiner*—Alison K. Pickard
(74) *Attorney, Agent, or Firm*—Jacobson Holman PLLC

(57) ABSTRACT

A magnetic fluid seal device that increases a permissible value of eccentricity for two members to improve sealability and decreases a variation of quality by injecting a magnetic fluid before assembling of parts, that saves structural members to achieve thinning, and that is easy to produce. An annular magnet 3 is buoyantly supported by the magnetic fluid 4 and 5 retained, and the space between a housing 1 and a shaft 2 is sealed by the annular magnet 3 and magnetic fluid 4 and 5.

36 Claims, 24 Drawing Sheets

(a)

(b)

UNIPOLAR
MAGNETIZATION (c)

MULTIPOLAR
MAGNETIZATION (a)

(b)

UNIPOLAR
MAGNETIZATION (c)

MULTIPOLAR
MAGNETIZATION

MAGNETIC FLUID SEAL DEVICE

This is a nationalization of PCT/JP02/04938 filed May 22, 2002 and published in Japanese.

TECHNICAL FIELD

The present invention relates to a relatively moving magnetic fluid seal device, and is applied as a dust seal in production machines, such as devices for manufacturing semiconductors, devices for manufacturing liquid crystal panel displays, devices for manufacturing hard disks, and devices for manufacturing optical parts, and as a dust seal built into products such as cameras, hard disk drives, and optical parts.

BACKGROUND ART

A conventional relatively moving magnetic fluid seal device seals a gap between two members by bringing a magnetic fluid that is retained at one of the two members into contact with a surface of the other member.

An example configuration of a conventional magnetic fluid seal device is illustrated in FIG. 24. This is a configuration in which a magnet 103, which is commonly magnetized in an axial direction, is sandwiched between and adhered to two pole pieces 104, disposed in a nonmagnetic housing 101, and a magnetic fluid 105 is filled into gaps between the pole pieces 104 and a magnetic material shaft 102.

However, the following problems arise in the case of the above-described conventional technology.

Because the magnetic fluid seal device of the conventional technology is fixed to the housing, the tolerance of eccentricity between the housing and the shaft becomes equal to or less than the gaps between the pole pieces and the shaft, and high precision in the coaxiality between the housing and the shaft has been necessary.

In this configuration, there has also been the complication that the filling of the magnetic fluid must be conducted after assembly of the device, and there has been the drawback that it is difficult to manage the magnetic fluid filling amount.

Moreover, because a regular thickness is necessary for the magnet and the pole pieces, there has been a limit to thinning. There has also been the drawback that the magnet and the pole pieces must be adhered.

The present invention was devised in order to solved the problems in the above-described conventional technology, and it is an object thereof to provide an easily manufacturable magnetic fluid seal device that improves sealability by enlarging the tolerance of eccentricity of the two members, that can reduce variations in quality by making it possible to inject the magnetic fluid before device assembly, and that improves thinning by reducing structural members.

DISCLOSURE OF THE INVENTION

The present invention adopts the following configurations in order to solve the above-described problems.

In order to achieve the above-described object, the invention is a magnetic fluid seal device that seals a space between two members that are assembled so as to be mutually relatively movable, the magnetic fluid seal device including:

magnetic force generating means that is disposed between the two members and generates a magnetic force; and a magnetic fluid that is magnetically retained at opposing ends of the magnetic force generating means opposing the two members and that seals two gaps between the magnetic force generating means and each member surface of the two members, wherein the magnetic force generating means is buoyantly supported by the magnetic fluid, and the space between the two members is sealed by the magnetic force generating means and the magnetic fluid.

Thus, the sum of the two gaps between each member surface of the two members and the magnetic force generating means becomes a tolerance of eccentricity of the two members, and sealability can be exhibited even if the precision of coaxiality is low. Also, members such as the pole pieces that have been conventionally used become unnecessary, structural members can be reduced, which is effective for thinning of the device, and manufacturing becomes easy without the need to join like members. Moreover, because the magnetic force generating means floats with a magnetic force by the magnetic fluid, the invention also exhibits a function as a rotation inertia damper using the magnetic force generating means as an inertial body and using the magnetic fluid as viscous damping means.

It is preferable for the magnetic fluid seal device to further include sleeves that are fitted together with at least one member of the two members, and for a groove to be formed in opposing surfaces of the sleeves opposing the magnetic force generating means.

Thus, the device can be fitted in a state in which the magnetic fluid is filled in advance between the magnetic force generating means and the sleeves, the fitting becomes easy, and management of the magnetic fluid filling amount becomes easy.

It is preferable for the sleeves to include two cross-sectionally L-shaped members comprising an axial-direction portion and a projecting portion that projects in a radial direction from the axial-direction portion at an opposite end portion at the axial direction, and for the sleeves to be configured by superposing the axial-direction portions of the cross-sectionally L-shaped members.

Thus, it becomes easy to dispose the magnetic force generating means in the grooves of the sleeves. Also, because the magnetic fluid seal device can be configured without the structural parts having elastic deformability, the degree of freedom with which materials can be selected becomes large.

It is preferable for an oil-repellant film to be formed on at least a surface portion, outside the groove, of the opposing surfaces of the sleeves opposing the magnetic force generating means.

Thus, it is possible to prevent the magnetic fluid from spreading on the surfaces outside the grooves and to prevent the magnetic fluid amount used in the seal from being reduced.

It is preferable for a portion of the sleeves that projects in a radial direction to be configured by a rubber-like elastic body.

Thus, it becomes easy to dispose the magnetic force generating means into the grooves of the sleeves by deforming the rubber-like elastic body.

It is preferable for a portion of the sleeves that fits together with the one of the members to be configured by a rubber-like elastic body.

Thus, adhesion of both in the fitting together of the sleeve with the one of the members becomes unnecessary.

It is preferable for the opposing ends of the magnetic force generating means opposing the two members to be pointed, and for magnetic flux to be concentrated at and for the magnetic fluid to be magnetically retained at pointed tips thereof.

Thus, the magnetic fluid is efficiently concentrated and retained without being dispersed, and it is thus possible to reduce the magnetic fluid filling amount.

It is preferable for the grooves of the sleeves to be formed in a shape that matches the pointed opposing ends of the magnetic force generating means.

Thus, it is further possible to prevent dispersion of the magnetic fluid.

It is preferable for the gaps between the pointed opposing ends of the magnetic force generating means and the grooves of the sleeves to narrow towards the tips of the pointed opposing ends of the magnetic force generating means.

Thus, it is further possible to reduce the magnetic fluid filling amount.

It is preferable for the pointed opposing ends of the magnetic force generating means to be cross-sectionally triangular protruding shapes.

Thus, the magnetic flux can be concentrated at, and the magnetic fluid can be efficiently concentrated and retained at, the pointed tips thereof.

It is preferable for the pointed opposing ends of the magnetic force generating means to be cross-sectionally arced protruding shapes.

Thus, the magnetic flux can be concentrated at, and the magnetic fluid can be efficiently concentrated and retained at, the pointed tips thereof.

It is preferable for the magnetic fluid seal device to further include sleeves that are fitted together with at least one of the two members, and for an oil-repellant film to be formed on at least both axial-direction end portions of the sleeves.

Thus, the device can be fitted in a state in which the magnetic fluid has been filled in advance between the magnetic force generating means and the sleeves, the fitting becomes easy, and management of the magnetic fluid filling amount becomes easy. Also, it is possible to prevent the magnetic fluid from spreading onto both axial-direction end portions of the sleeves and to prevent the magnetic fluid filling amount from being reduced.

It is preferable for the two members to be relatively reciprocally movable, and for the magnetic fluid seal device to include a sleeve that fits together with at least one of the two members and extends in an axial direction corresponding to a reciprocal movement length of the two members.

Thus, the device can be fitted in a state in which the magnetic fluid has been filled in advance between the magnetic force generating means and the sleeves, the fitting becomes easy, and management of the magnetic fluid filling amount becomes easy. Also, it is possible to make the magnetic fluid slide on the sleeve extending in the axial direction corresponding to the reciprocal movement length of the two members.

It is preferable for a groove corresponding to the reciprocal movement length of the two members to be formed in an opposing surface of the sleeve opposing the magnetic force generating means.

Thus, the device can be fitted in a state in which the magnetic fluid has been filled in advance between the magnetic force generating means and the sleeves, the fitting becomes easy, and scattering of the magnetic fluid outside of the groove is prevented, so that management of the magnetic fluid filling amount becomes easy. Also, it is possible to prevent the magnetic fluid from sliding in the groove of the sleeve corresponding to the reciprocal movement length of the two members.

It is preferable for an oil-repellant film to be formed on the opposing surface of the sleeve opposing the magnetic force generating means.

Thus, it is possible to prevent the magnetic fluid sliding at the time of relative reciprocal movement from spreading on the surface and to prevent the magnetic fluid amount used in the seal from being reduced.

It is preferable for the sleeves to have an elastic deformation characteristic that enables the magnetic force generating means to be inserted into the grooves of the sleeves.

Thus, smooth fitting of the magnetic force generating means is possible.

It is preferable for the two members and the sleeves to be nonmagnetic materials.

Thus, the magnetic fluid can be gathered at the magnetic poles of the magnetic force generating means and the magnetic force generating means can be made to float magnetically.

It is preferable for a groove to be formed in an opposing surface of at least one member of the two members opposing the magnetic force generating means.

Thus, members such as sleeves and pole pieces that have been used conventionally become unnecessary, the device can be configured by only the magnetic force generating means and the magnetic fluid, structural members can be reduced, and thinning becomes largely possible.

It is preferable for an oil-repellant film to be formed on an opposing surface of at least one member of the two members opposing the magnetic force generating means.

Thus, it is possible to prevent the magnetic fluid from spreading on the surface of the one member and to prevent the magnetic fluid amount used in the seal from being reduced.

It is preferable for the magnetic force generating means to have an elastic deformation characteristic that enables the magnetic force generating means to be inserted into the grooves.

Thus, smooth fitting of the magnetic force generating means is possible.

It is preferable for an oil-repellant film to be formed on a portion of the magnetic force generating means that does not contact the magnetic fluid.

Thus, it is possible to prevent the magnetic fluid from spreading on the surface of the magnetic force generating means and to prevent the magnetic fluid amount used in the seal from being reduced.

It is preferable for a cutout portion to be formed in a portion of the magnetic force generating means that does not contact the magnetic fluid.

Thus, weight reduction of the magnetic force generating means is improved, and it is possible to make the magnetic force generating means float more reliably.

It is preferable for a cutout portion to be formed in a side surface of the magnetic force generating means extending between the two members.

Thus, weight reduction of the magnetic force generating means is improved, and it is possible to make the magnetic force generating means float more reliably.

It is preferable for cutout portions to be formed in center portions of opposing end surfaces of the magnetic force generating means opposing the two members.

Thus, weight reduction of the magnetic force generating means is improved, and it is possible to make the magnetic force generating means float more reliably.

It is preferable for the magnetic force generating means to be a magnet that is unipolarly or multipolarly magnetized in the axial direction or the radial direction.

Thus, the magnet and the magnetic fluid fill the space between the two members and can seal the two members.

A magnetic fluid seal device that seals a space between two members that are assembled so as to be mutually relatively movable, characterized by including:

sleeve-like magnetic force generating means that are respectively fitted together with the two members and generate a magnetic force;

a nonmagnetic member that is disposed between the sleeve-like magnetic force generating means; and magnetic fluid that is magnetically retained at opposing surfaces of the sleeve-like magnetic force generating means opposing the nonmagnetic member and that seals two gaps between the sleeve-like magnetic force generating means and the nonmagnetic member, wherein the nonmagnetic member is buoyantly supported by the magnetic fluid, and the space between the two members is sealed by the nonmagnetic member and the magnetic fluid.

Thus, the sum of the two gaps between each member surface of the two members and the nonmagnetic member becomes a tolerance of eccentricity of the two members, and the magnetic fluid seal device can exhibit sealability even if the precision of the coaxiality is low. Also, members such as the pole pieces that have been conventionally used become unnecessary, structural members can be reduced, which is effective for thinning of the device, and manufacturing becomes easy without the need to join members. Moreover, because the nonmagnetic member floats with a magnetic force by the magnetic fluid, the magnetic fluid seal device also exhibits a function as a rotation inertia damper using the nonmagnetic member as an inertial body and using the magnetic fluid as viscous damping means. In particular, because nonmagnetic member can be made thin and light without changing the magnetic force, the nonmagnetic member can be made to float magnetically even if the diameter of the device is increased.

It is preferable for a groove to be formed in an opposing surface of at least one of the sleeve-like magnetic force generating means opposing the nonmagnetic member.

Thus, the device can be fitted in a state in which the magnetic fluid has been filled in advance between the sleeve-like magnetic force generating means and the nonmagnetic member, the fitting becomes easy, and management of the magnetic fluid filling amount becomes easy.

It is preferable for the sleeve-like magnetic force generating means to include two cross-sectionally L-shaped members comprising an axial-direction portion and a projecting portion that projects in a radial direction from the axial-direction portion at an opposite end portion at the axial direction, and for the sleeve-like magnetic force generating means to be configured by superposing the axial-direction portions of the cross-sectionally L-shaped members.

Thus, it becomes easy to dispose the nonmagnetic member in the grooves of the sleeve-like magnetic force generating means. Also, because the magnetic fluid seal device can be configured without structural parts having elastic deformability, the degree of freedom with which materials can be selected is increased.

It is preferable for an oil-repellant film to be formed on at least a surface portion, outside the groove, of the opposing surface of the sleeve-like magnetic force generating means opposing the nonmagnetic member.

Thus, it is possible to prevent the magnetic fluid from spreading on the surface outside the groove and to prevent the magnetic fluid amount used in the seal from being reduced.

It is preferable for an oil-repellant film to be formed on at least both axial-direction end portions of the sleeve-like magnetic force generating means.

Thus, the device can be fitted in a state in which the magnetic fluid had been filled in advance between the sleeve-like magnetic force generating means and the nonmagnetic member, the fitting becomes easy, and management of the magnetic fluid filling amount becomes easy. Also, it is possible to prevent the magnetic fluid from spreading on both axial-direction end portions of the sleeve-like magnetic force generating means and to prevent the magnetic fluid used in the seal from being reduced.

It is preferable for the two members to be relatively reciprocally movable, and for the sleeve-like magnetic force generating means fitted together with at least one member of the two members to be extended in an axial direction corresponding to a reciprocal movement length of the two members.

Thus, the device can be fitted in a state in which the magnetic fluid has been filled in advance between the sleeve-like magnetic force generating means and the nonmagnetic member, the fitting becomes easy, and management of the filling amount becomes easy. Also, the magnetic fluid can be retained on the sleeve-like magnetic force generating means extending in the axial direction corresponding to the reciprocal movement length of the two members.

It is preferable for a groove corresponding to the reciprocal movement length of the two members to be formed in an opposing surface of the sleeve-like magnetic force generating means opposing the nonmagnetic member.

Thus, the device can be fitted in a state in which the magnetic fluid has been filled in advance between the sleeve-like magnetic force generating means and the nonmagnetic member, the fitting becomes easy, and scattering of the magnetic fluid outside of the groove is prevented, so that management of the magnetic fluid filling amount becomes easy. Also, the magnetic fluid can be retained in the groove of the sleeve-like magnetic force generating means corresponding to the reciprocal movement length of the two members.

It is preferable for the sleeve-like magnetic force generating means to have an elastic deformation characteristic that enables the nonmagnetic member to be inserted into the grooves of the sleeve-like magnetic force generating means.

Thus, smooth fitting of the nonmagnetic member is possible.

It is preferable for the nonmagnetic member to have an elastic deformation characteristic that enables the nonmagnetic member to be inserted into the grooves of the sleeve-like magnetic force generating means.

Thus, smooth fitting of the nonmagnetic member is possible.

It is preferable for an oil-repellant film to be formed on a portion of the nonmagnetic member that does not contact the magnetic fluid.

Thus, it is possible to prevent the magnetic fluid from spreading on the surface of the nonmagnetic member and to prevent the magnetic fluid amount used in the seal from being reduced.

It is preferable for a cutout portion to be formed in a portion of the nonmagnetic member that does not contact the magnetic fluid.

Thus, weight reduction of the nonmagnetic member is improved and it is possible to make the nonmagnetic member float more reliably.

It is preferable for a cutout portion to be formed in a side surface of the nonmagnetic member extending between the two members.

Thus, weight reduction of the nonmagnetic member is improved and it is possible to make the nonmagnetic member float more reliably.

It is preferable for cutout portions to be formed in center portions of opposing end surfaces of the nonmagnetic member opposing the two members.

Thus, weight reduction of the nonmagnetic member is improved and it is possible to make the nonmagnetic member float more reliably.

It is preferable for the sleeve-like magnetic force generating means to be a magnet that is unipolarly or multipolarly magnetized in the axial direction or the radial direction.

Thus, the magnet is fitted to the two members and the magnetic fluid can be retained.

BEST MODES FOR CARRYING OUT THE INVENTION

Preferable embodiments of the invention will be exemplarily described in detail below with reference to the drawings. However, unless otherwise specified, dimensions, materials, forms, and relative disposition of structural parts disclosed in these embodiments are not intended to limit the scope of the invention thereto. Also, unless new indication is given, materials, forms, and the like in regard to members that have already been described once in the description below are the same as those in their initial description.

The embodiments apply a magnetic fluid seal device as a dust seal in production machines, such as devices for manufacturing semiconductors, devices for manufacturing liquid crystal panel displays, devices for manufacturing hard disks, and devices for manufacturing optical parts, and as a dust seal built into products such as cameras, hard disk drives, and optical parts.

FIRST EMBODIMENT

Figure 1:
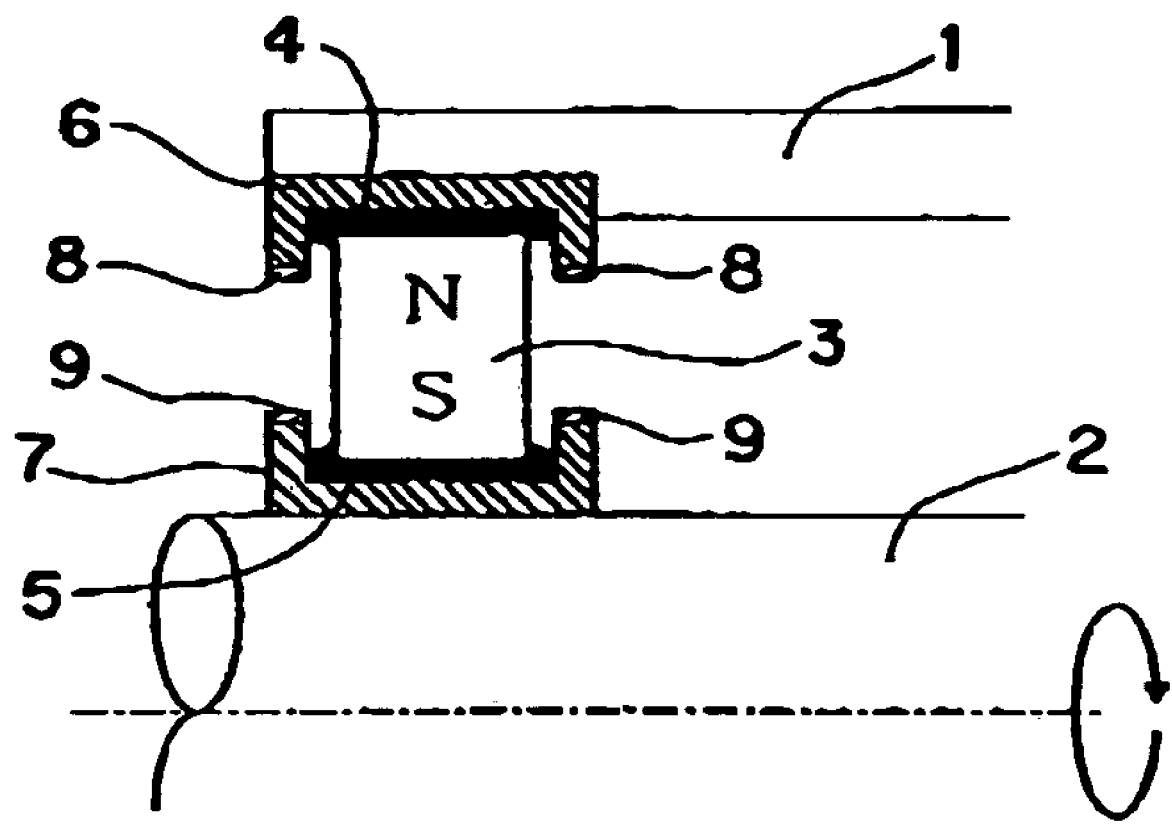
FIG. 1 is a half cross-sectional view illustrating a magnetic fluid seal device in accordance with a first embodiment.

Using FIG. 1, the configuration of a magnetic fluid seal device in accordance with a first embodiment will be described. FIG. 1 is a half cross-sectional view illustrating the magnetic fluid seal device in accordance with the first embodiment.

The magnetic fluid seal device illustrated in FIG. 1 is disposed between a cylindrical housing 1 and a shaft 2 that is inserted into the housing 1, which serve as two rotatably movable members. Relative rotational movement is conducted between the housing 1 and the shaft 2 and, in the present embodiment, only the shaft 2 rotates. The housing 1 and the shaft 2 are configured by nonmagnetic materials.

The magnetic fluid seal device includes an annular magnet 3 (magnetic force generating means), which is magnetized in the radial direction and disposed between the housing 1 and the shaft 2, magnetic fluids 4 and 5, which are respectively retained at inner and outer peripheral end portions of the annular magnet 3, and sleeves 6 and 7, which are respectively fitted together with the housing 1 and the shaft 2.

A magnetic field gradient is generated near inner and outer peripheral surfaces, which are magnetic poles, of the annular magnet 3, the magnetic fluids 4 and 5 disposed inside these magnetic field gradients are sucked in toward the upper field (magnet surface), and, as a reaction force against it, the sleeves 6 and 7, which are nonmagnetic materials, receive a repulsive force toward the lower magnetic field. As a result, the annular magnet 3 floats in the magnetic fluids 4 and 5 in a state in which it does not contact the sleeves 6 and 7, and, at the same time, the magnetic fluids 4 and 5 exhibit the function of sealing the gaps between the annular magnet 3 and the sleeves 6 and 7.

It is preferable to use a plastic magnet that has a small specific gravity etc. as the annular magnet 3. The annular magnet 3 is preferably magnetized in the longitudinal direction of the magnet cross-section (in the present embodiment, the radial direction) in order to raise magnetic field strength near the magnet surface, and further improvement is possible when the annular magnet 3 is multipolarly magnetized. However, the dimensions, material, and method of magnetization of the annular magnet 3 are not limited to the above descriptions as long as the annular magnet 3 satisfies the condition that it floats in the magnetic fluids 4 and 5 in a state in which it does not contact the sleeves 6 and 7.

As the magnetic fluids 4 and 5, a fluid is used in which fine particles of $Fe_3O_4$, $Mn/ZnFe_2O_4$, etc. are dispersed in colloid form in oil, water, an organic solvent, etc.

The sleeves 6 and 7 are cylindrical members made of a nonmagnetic metal, such as nonmagnetic stainless steel, an aluminum alloy, a copper alloy, or a titanium alloy, or a resin such as polyphenylene oxide, polycarbonate, or polyacetal, center portions are recessed and grooves are formed so that projecting portions project at both axial-direction end portions, and the inner and outer peripheral end portions of the annular magnet 3 have gaps that are respectively disposed in the grooves. The magnetic fluids 4 and 5 are filled into the gaps between inner and outer peripheral ends of the annular magnet 3 and the grooves of the sleeves 6 and 7.

The sleeves 6 and 7 have an elastic deformation characteristic that enables the annular magnet 3 to be inserted into the grooves of the sleeves 6 and 7, so that smooth fitting of the annular magnet 3 is possible.

Oil-repellant films 8 and 9 are formed on surfaces of the projecting portions (i.e., the portions other than the inner grooves of the surfaces opposing the annular magnet 3) of both axial-direction end portions of the sleeves 6 and 7. The magnetic fluids 4 and 5 within the grooves of the sleeves 6 and 7 are prevented from spreading to the outside by the oil-repellant films 8 and 9.

As processes for forming the oil-repellant films 8 and 9, there are processes by coating, application, and the like other than film formation, and a material such as a fluorine oil-repellant agent is used.

The above magnetic fluid seal device is easily fitted with one touch-between the housing 1 and the shaft 2 in a state in which the magnetic fluids 4 and 5 have been filled in advance between the annular magnet 3 and the sleeves 6 and 7.

In the magnetic fluid seal device, the annular magnet 3 is buoyantly supported by the retained magnetic fluids 4 and 5, and the annular magnet 3 floats regardless of the orientation with which the device is disposed.

The space between the housing 1 and the shaft 2 is sealed by the annular magnet 3 and the magnetic fluids 4 and 5. As a result, the function that seals the shaft 2 with respect to the housing 1 can be exhibited by the eccentricity of the sum of the two gaps between the inner and outer peripheral surfaces of the annular magnet 3 and the sleeves 6 and 7.

Therefore, because the magnetic fluid seal device has a configuration including gaps that retain the magnetic fluids 4 and 5 at both the inner and outer peripheries of the annular magnet 3, the sum of both gaps becomes the tolerance of coaxiality of the housing 1 and the shaft 2, and sealability can be exhibited even when precision is low.

Because the annular magnet 3 floats with the magnetic force due to the magnetic fluids 4 and 5, the magnetic seal fluid device also exhibits a function as a rotation inertia damper using the annular magnet 3 as an inertial body and using the magnetic fluids 4 and 5 as viscous damping means.

Also, in regard to the members used in the magnetic fluid seal device, because there are no members such as pole pieces and only the annular magnet 3 requires thickness, the structural members can be reduced and the device can be thinned. Manufacture also becomes easy because there is no need to join members with each other including members such as the pole pieces.

Moreover, because the inner and outer peripheral end portions of the annular magnet 3 are disposed in the grooves of the sleeves 6 and 7, the device can be fitted in a state in which the magnetic fluids 4 and 5 have been filled in advance in the device, the fitting becomes easy, and management of the magnetic fluid filling amount becomes easy.

SECOND EMBODIMENT

Figure 2:
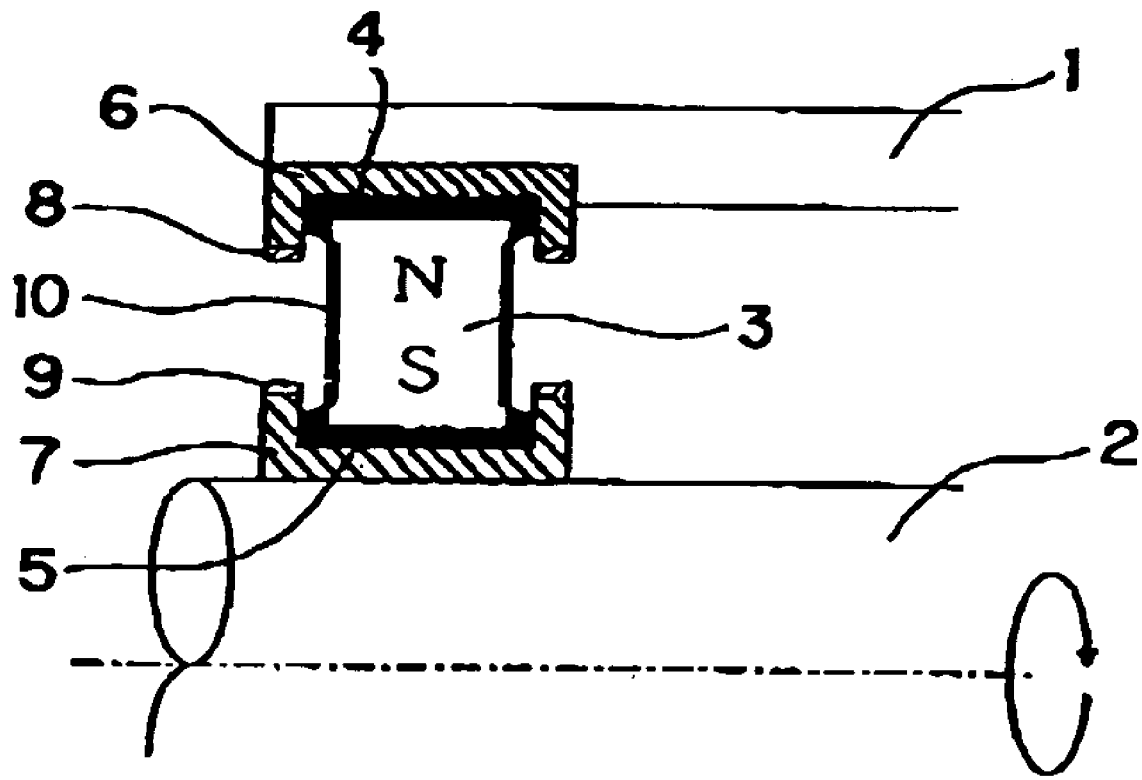
FIG. 2 is a half cross-sectional view illustrating a magnetic fluid seal device in accordance with a second embodiment.

FIG. 2 illustrates a magnetic fluid seal device in accordance with a second embodiment. The second embodiment is one in which an oil-repellant film 10 is formed on a radial-direction side surface of the annular magnet 3. Other configurations are the same as those of the first embodiment.

The oil-repellant film 10 is formed on the portion of the annular magnet 3 that does not contact the magnetic fluids 4 and 5 (i.e., on the radial-direction side surface of the annular magnet 3 excluding corner portions).

The oil-repellant film 10 is not formed on the corner portions of the radial-direction side surface of the annular magnet 3, and the corner portions relate to the seal and magnetic buoyancy due to the adhesion of the magnetic fluids 4 and 5.

Thus, the spread of the magnetic fluids 4 and 5 on the radial-direction side surface of the annular magnet 3 and a reduction in the magnetic fluid amount necessary for the seal can be prevented, and the sealing function can be exhibited with respect to any orientation with an even less magnetic fluid filling amount that is filled in advance.

THIRD EMBODIMENT

Figure 3:
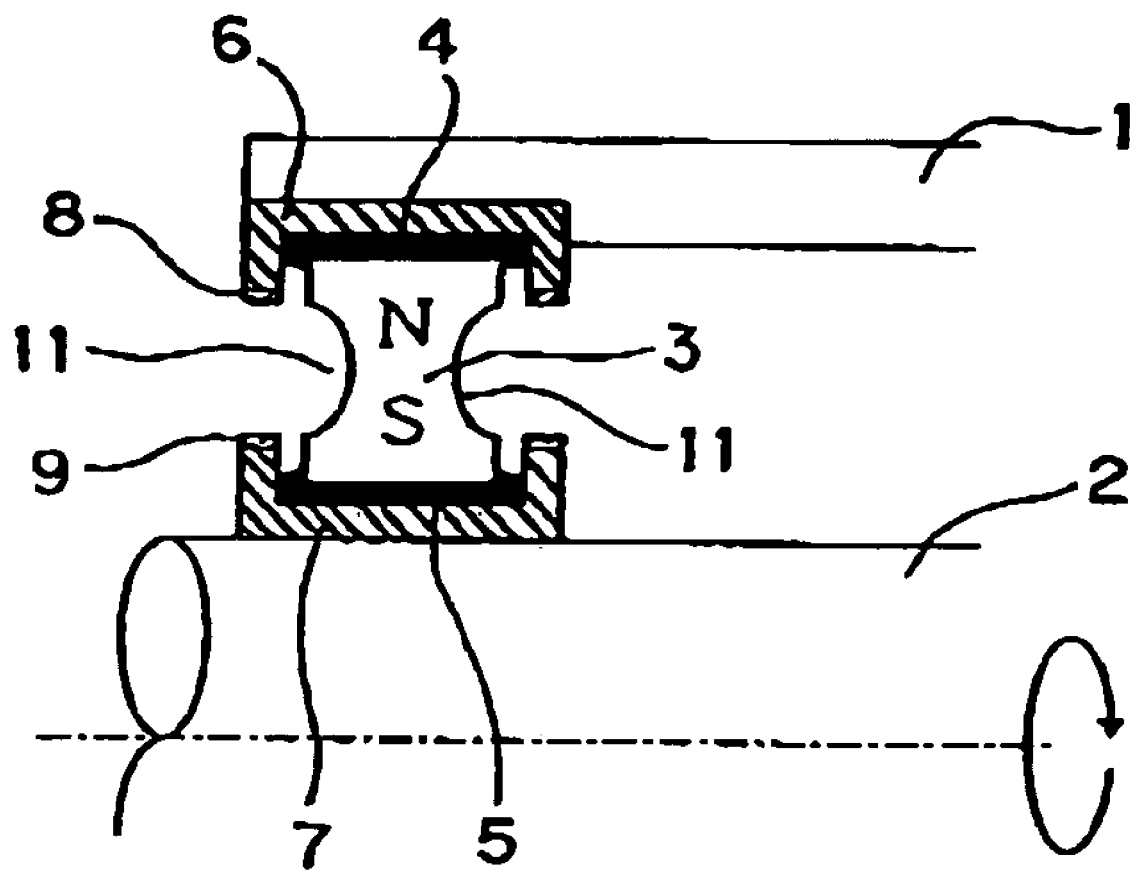
FIG. 3 is a half cross-sectional view illustrating a magnetic fluid seal device in accordance with a third embodiment.

FIG. 3 illustrates a magnetic fluid seal device in accordance with a third embodiment. The third embodiment is one in which a cutout portion 11 is formed in the radial-direction side surface of the annular magnet 3. Other configurations are the same as those of the first embodiment.

The cutout portion 11 is formed in the portion of the annular magnet 3 that does not contact the magnetic fluids 4 and 5 (i.e., in the radial-direction side surface of the annular magnet 3 excluding corner portions and extending between the housing 1 and the shaft 2).

Thus, weight reduction of the annular magnet 3 is improved, and the annular magnet 3 can float with respect to any orientation with an even less magnetic fluid filling amount or with magnetic fluids 4 and 5 of an even lower saturation magnetization.

FOURTH EMBODIMENT

Figure 4:
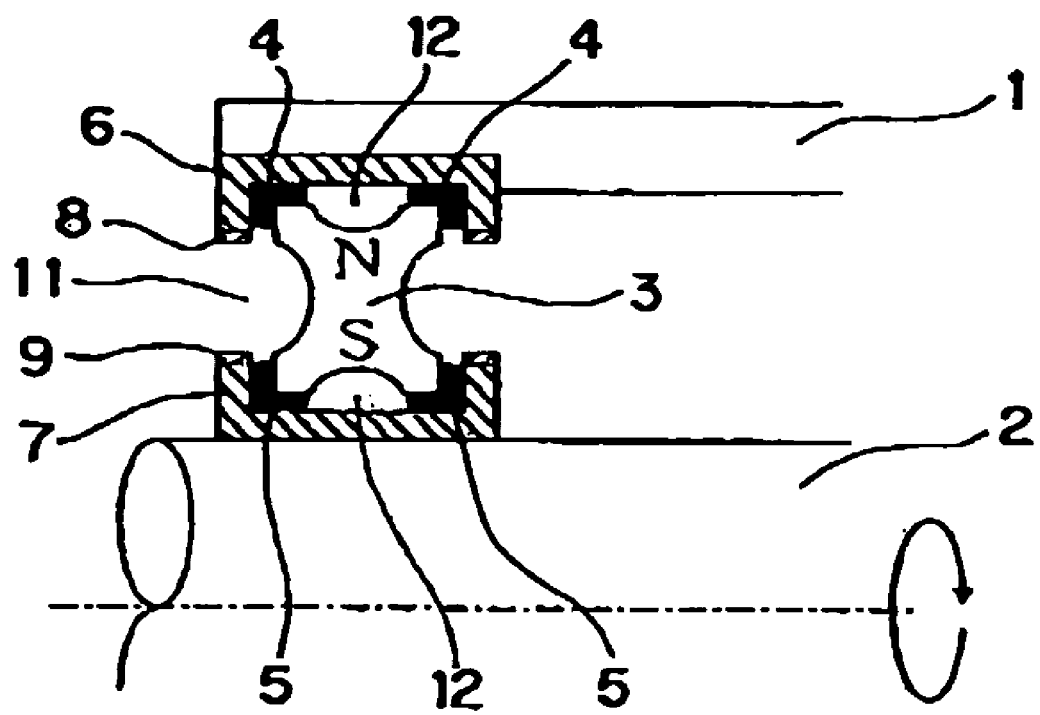
FIG. 4 is a half cross-sectional view illustrating a magnetic fluid seal device in accordance with a fourth embodiment.

FIG. 4 illustrates a magnetic fluid seal device in accordance with a fourth embodiment. The fourth embodiment is one in which cutout portions 12 are formed in center portions of the inner and outer peripheral surfaces, in addition to the cutout portion 11 in the radial-direction side surface of the annular magnet 3. Other configurations are the same as those of the first embodiment.

Similar to the third embodiment, the cutout portion 11 is formed in the portion of the annular magnet 3 that does not contact the magnetic fluids 4 and 5 (i.e., in the radial-direction side surface of the annular magnet 3 excluding corner portions and extending between the housing 1 and the shaft 2).

In addition, the cutout portions 12 are formed in the center portions of the inner and outer peripheral surfaces opposing the housing 1 or the shaft 2 excluding the corner portions of the annular magnet 3.

Thus, weight reduction of the annular magnet 3 is improved, and the annular magnet 3 can float with respect to any orientation with an even less magnetic fluid filling amount or with magnetic fluids 4 and 5 of an lower saturation magnetization.

FIFTH EMBODIMENT

Figure 5:
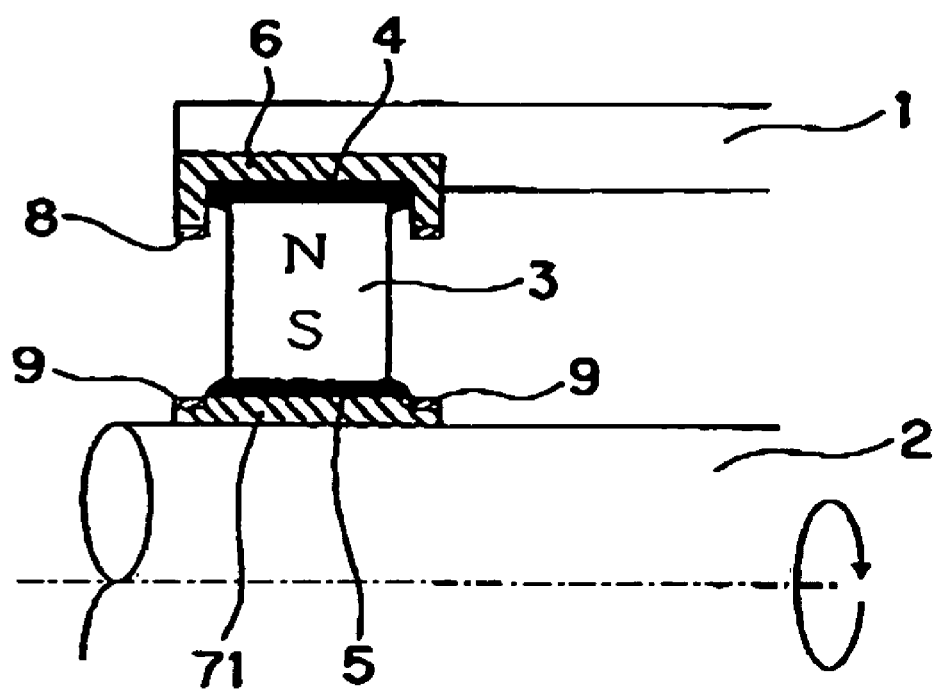
FIG. 5 is a half cross-sectional view illustrating a magnetic fluid seal device in accordance with a fifth embodiment.

FIG. 5 illustrates a magnetic fluid seal device in accordance with a fifth embodiment. The fifth embodiment is one in which no groove is formed in a sleeve 71 fitted together with the shaft 2 and in which the oil-repellant film 9 is formed on both axial-direction end portions of opposing surfaces opposing the annular magnet 3. Other configurations are the same as those of the first embodiment.

The sleeve 71 fitted together with the shaft 2 is a cylindrical shape that does not have formed therein a groove such as the one in the first embodiment. The oil-repellant film 9 is formed on both of the axial-direction end portions of opposing surfaces opposing the annular magnet 3.

In this configuration also, the annular magnet 3 floats with a magnetic force with respect to any orientation, and functions as a dust seal with respect to the rotation of the shaft 2.

It should be noted that, as an alternative to the present embodiment, similar effects can be obtained by not forming the groove in the sleeve of the housing 1 and forming an oil-repellant film 8 on both axial-direction end portions of opposing surfaces opposing the annular magnet 3.

SIXTH EMBODIMENT

Figure 6:
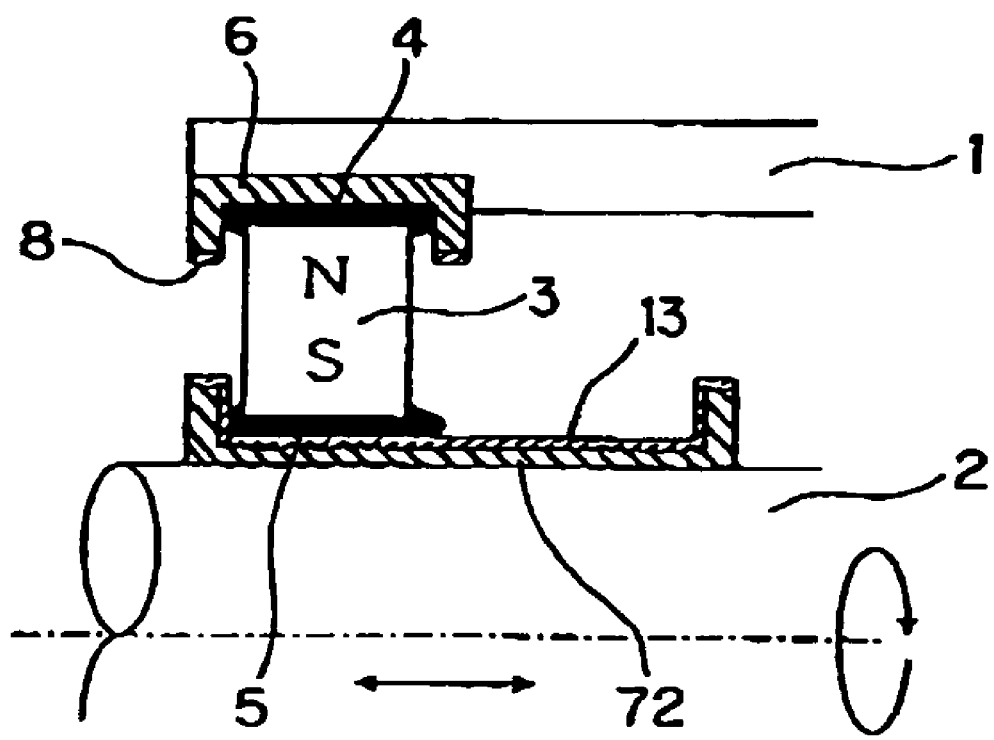
FIG. 6 is a half cross-sectional view illustrating a magnetic fluid seal device in accordance with a sixth embodiment.

FIG. 6 illustrates a magnetic fluid seal device in accordance with a sixth embodiment. The sixth embodiment is one in which relative reciprocal movement is conducted between the housing 1 and the shaft 2, a sleeve 72 fitted together with the shaft 2 is extended in the axial direction to a reciprocal movement length, and an oil-repellant film 13 is formed on the entire opposing surface opposing the annular magnet 3. Other configurations are the same as those of the first embodiment.

In the present embodiment, not only is relative rotational movement conducted between the housing 1 and the shaft 2, but relative reciprocal movement is also conducted between the housing 1 and the shaft 2, and, in the present embodiment, the shaft 2 reciprocally moves.

Thus, it is necessary to stabilize and support the magnetic fluid seal device by sliding the magnetic fluid, and, in the present embodiment, the device has a configuration in which the sleeve 72 fitted together with the shaft 2 is extended in the axial direction to the length at which the shaft 2 reciprocally moves, and the magnetic fluid 5 on the sleeve 72 is slid.

In this instance, in order to prevent the magnetic fluid 5 from spreading onto the sleeve 72, the oil-repellant film 13 is formed on the entire opposing surface opposing the annular magnet 3 on the sleeve 72 fitted together with the shaft 2.

In this configuration also, the annular magnet 3 floats with a magnetic force with respect to any orientation, and functions as a dust seal with respect to the rotational/reciprocal movement of the shaft 2. The present embodiment is, of course, also suited for a case where the shaft 2 only moves reciprocally.

It should be noted that, as an alternative to the present embodiment, similar effects can be obtained by extending the sleeve of the housing 1 in the axial direction to the reciprocal movement length and forming the oil-repellant film on the entire opposing surface opposing the annular magnet 3.

SEVENTH EMBODIMENT

Figure 7:
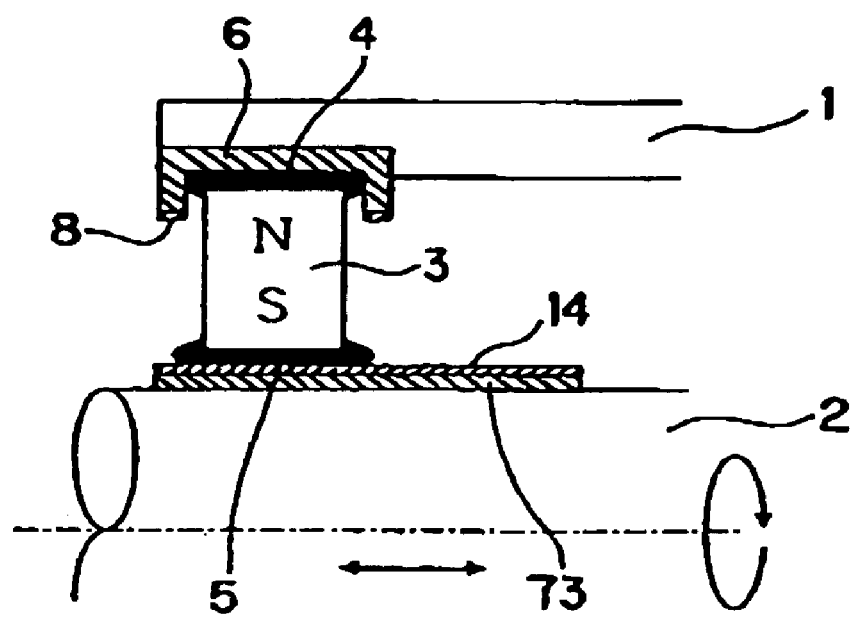
FIG. 7 is a half cross-sectional view illustrating a magnetic fluid seal device in accordance with a seventh embodiment.

FIG. 7 illustrates a magnetic fluid seal device in accordance with a seventh embodiment. The seventh embodiment is one in which relative reciprocal movement is conducted between the housing 1 and the shaft 2, a sleeve 73 fitted together with the shaft 2 is extended in the axial direction to a reciprocal movement length without a groove being formed in the sleeve 73, and an oil-repellant film is formed on the entire opposing surface opposing the annular magnet 3. Other configurations are the same as those of the first embodiment.

Similar to the sixth embodiment, in the present embodiment, not only is relative rotational movement conducted between the housing 1 and the shaft 2, but relative reciprocal movement is also conducted between the housing 1 and the shaft 2, and, in the present embodiment, the shaft 2 reciprocally moves.

Thus, it is necessary to stabilize and support the magnetic fluid seal device by sliding the magnetic fluid, and, in the present embodiment, the device has a configuration in which the cylindrical sleeve 73 fitted together with the shaft 2 is extended in the axial direction to the length at which the shaft 2 reciprocally moves, and the magnetic fluid 5 on the sleeve 73 is slid.

In this instance, in order to prevent the magnetic fluid 5 from spreading onto the sleeve 73, an oil-repellant film 14 is formed on the entire opposing surface opposing the annular magnet 3 on the sleeve 73 fitted together with the shaft 2.

Here, contrary to the sixth embodiment, the sleeve 73 fitted together with the shaft 2 is a cylindrical shape that does not have formed therein a groove such as the one in the first embodiment.

In this configuration also, the annular magnet 3 floats with a magnetic force with respect to any orientation, and functions as a dust seal with respect to the rotational/reciprocal movement of the shaft 2. The present embodiment is, of course, also suited for a case where the shaft 2 only moves reciprocally.

It should be noted that, as an alternative to the present embodiment, similar effects can be obtained by extending the sleeve of the housing 1 in the axial direction to the reciprocal movement length and forming the oil-repellant film on the entire opposing surface opposing the annular magnet 3, without there being formed a groove such as the one in the first embodiment.

EIGHTH EMBODIMENT

Figure 8:
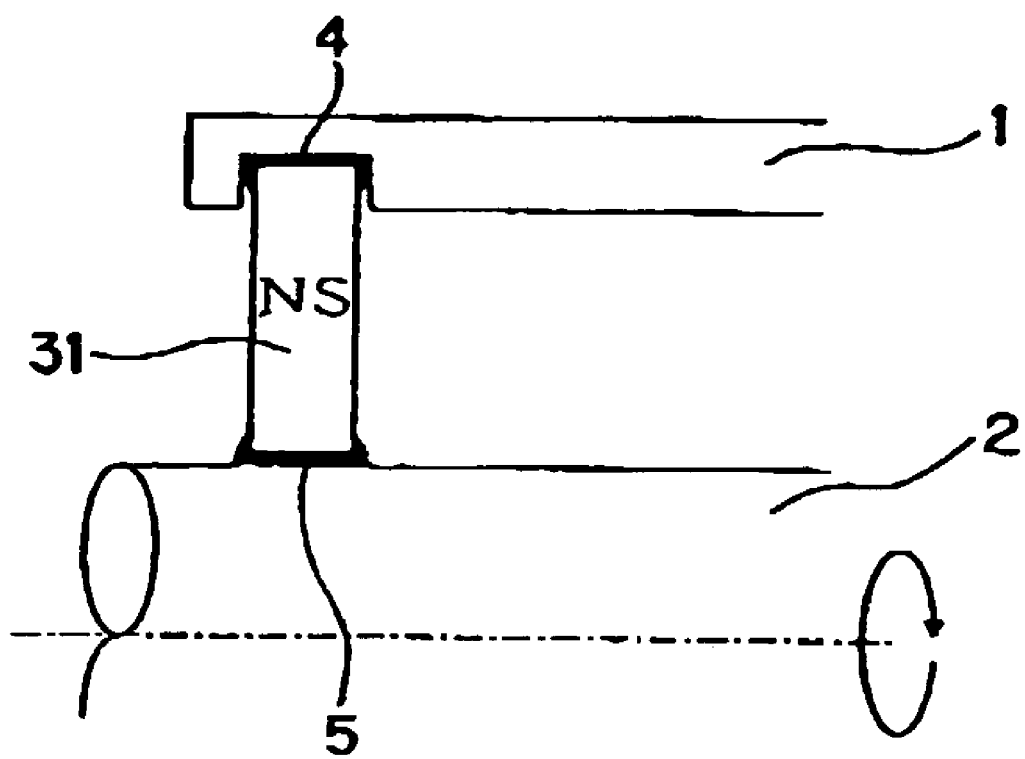
FIG. 8 is a half cross-sectional view illustrating a magnetic fluid seal device in accordance with an eighth embodiment.

FIG. 8 illustrates a magnetic fluid seal device in accordance with an eighth embodiment. The eighth embodiment is one in which a groove is formed in the inner periphery of the housing 1, an annular magnet (rubber magnet, etc.) 31 having an elastic deformation characteristic is inserted therein, and the magnetic fluids 4 and 5 are filled into the gaps formed in the inner and outer peripheries of the annular magnet 31. Other configurations are the same as those of the first embodiment.

In the present embodiment, no sleeve is fitted together with the housing 1 and the shaft 2, but a groove, which is disposed so that an outer peripheral end portion of the annular magnet 31 includes a gap, is directly formed in the housing 1.

Here, because it is necessary for the annular magnet 31 to be deformed and inserted into the groove of the housing 1, a rubber magnet having an elastic deformation characteristic (flexibility) is used.

After the annular magnet 31 has been inserted into the groove of the housing 1, the magnetic fluid 4 is filled into the gap between the groove of the housing 1 and the annular magnet 31, and the magnetic fluid 5 is filled into the gap between the shaft 2 surface and the annular magnet 31.

In this configuration also, the annular magnet 31 floats with a magnetic force with respect to any orientation, and functions as a dust seal with respect to the rotation of the shaft 2.

It should be noted that the same effects can be obtained with a configuration in which the groove is formed in the shaft 2 or a configuration in which grooves are formed in both of the housing 1 and the shaft 2.

NINTH EMBODIMENT

Figure 9:
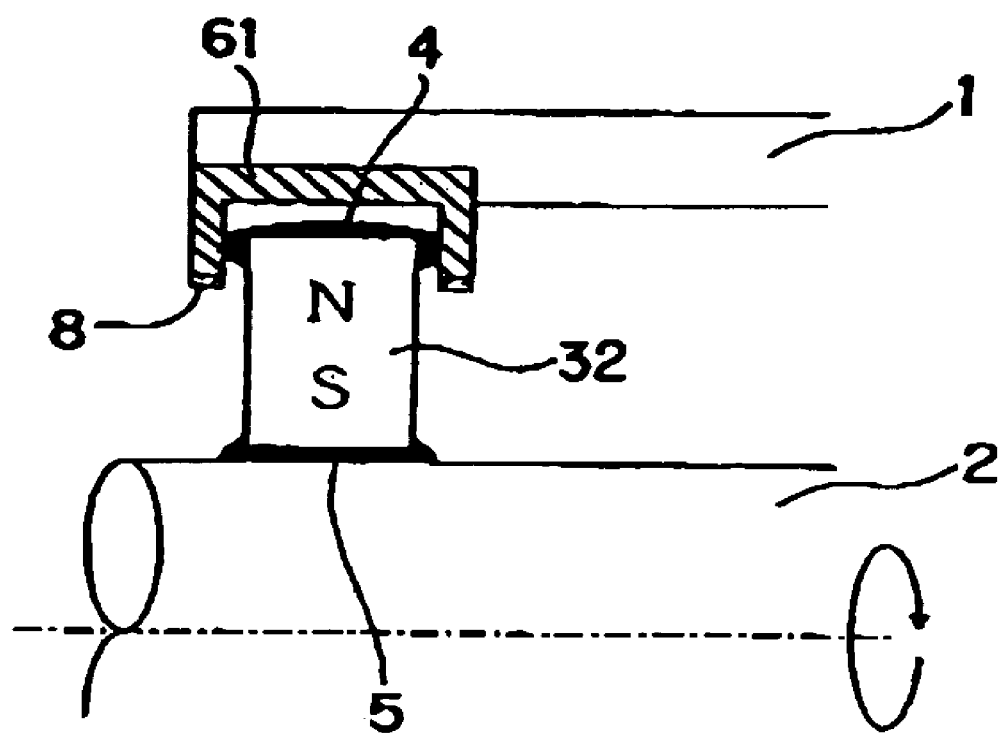
FIG. 9 is a half cross-sectional view illustrating a magnetic fluid seal device in accordance with a ninth embodiment.

FIG. 9 illustrates a magnetic fluid seal device in accordance with a ninth embodiment. The ninth embodiment is one in which a gap is directly formed between the shaft 2 surface and an annular magnet (rubber magnet, etc.) 32 having an elastic deformation characteristic, and in which a groove formed in a sleeve 61 of the housing 1 is formed deeply. Other configurations are the same as those of the first embodiment.

In the present embodiment, no sleeve is fitted together with the shaft 2, but a gap, into which the magnetic fluid 5 is filled, is directly formed between the shaft 2 surface and the annular magnet (rubber magnet, etc.) 32 having an elastic deformation characteristic (flexibility).

The sleeve 61 fitted together with the housing 1 includes the groove deeply formed therein so that there is a large gap between the sleeve 61 and the annular magnet 32 outer peripheral surface. The oil-repellant film 8 is formed on surfaces of projecting portions of both axial-direction end portions of the sleeve 61 (i.e., portions outside the groove inside the surface opposing the annular magnet 32).

In this configuration also, the function that seals the shaft 2 with respect to the housing 1 can be exhibited even if there is eccentricity of the sum of the two gaps in the inner and outer peripheral surfaces of the annular magnet 32, and the annular magnet 32 floats with a magnetic force with respect to any orientation and functions as a dust seal with respect to the rotational movement of the shaft 2.

TENTH EMBODIMENT

Figure 10:
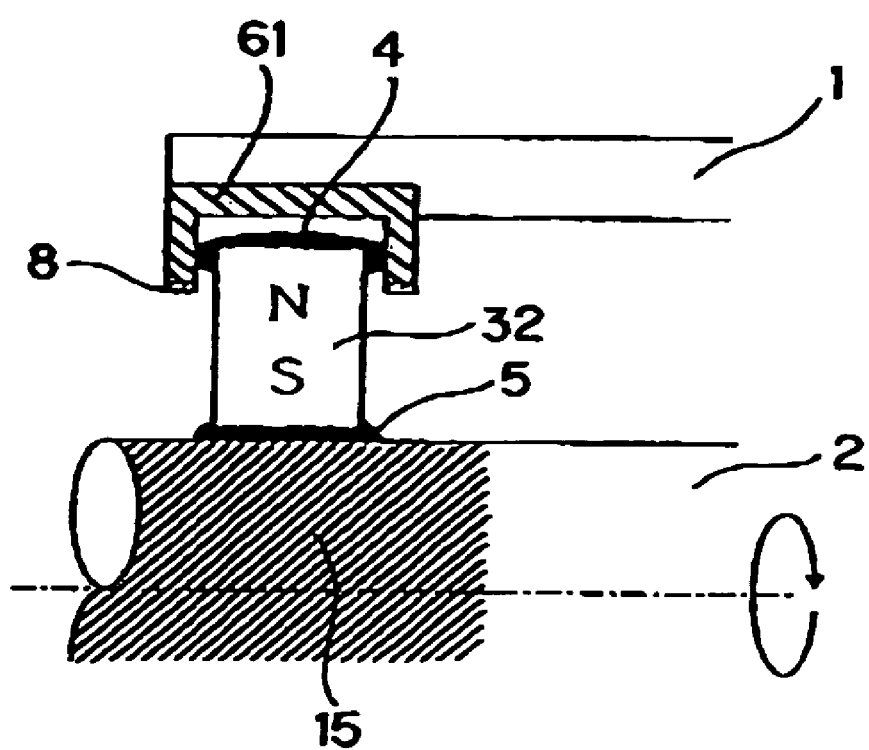
FIG. 10 is a half cross-sectional view illustrating a magnetic fluid seal device in accordance with a tenth embodiment.

FIG. 10 illustrates a magnetic fluid seal device in accordance with a tenth embodiment. The tenth embodiment is one in which, in the ninth embodiment, an oil-repellant film 15 is formed on the surface of the shaft 2 contacting the magnetic fluid 5. Other configurations are the same as those of the first embodiment.

In the present embodiment, in addition to the configuration of the ninth embodiment, the oil-repellant film 15 is formed in advance on the shaft 2 surface at least in a range that the magnetic fluid 5, which is retained at the annular magnet 32 inner peripheral surface, contacts when the magnetic fluid seal device is fitted.

Thus, the magnetic fluid seal device can be fitted in a state in which the magnetic fluids 4 and 5 have been filled in advance in the magnetic fluid seal device. Also, in the present embodiment, the magnetic fluid seal device functions as a dust seal with respect to reciprocal movement or rotational/reciprocal movement of the shaft 2.

ELEVENTH EMBODIMENT

Figure 11:
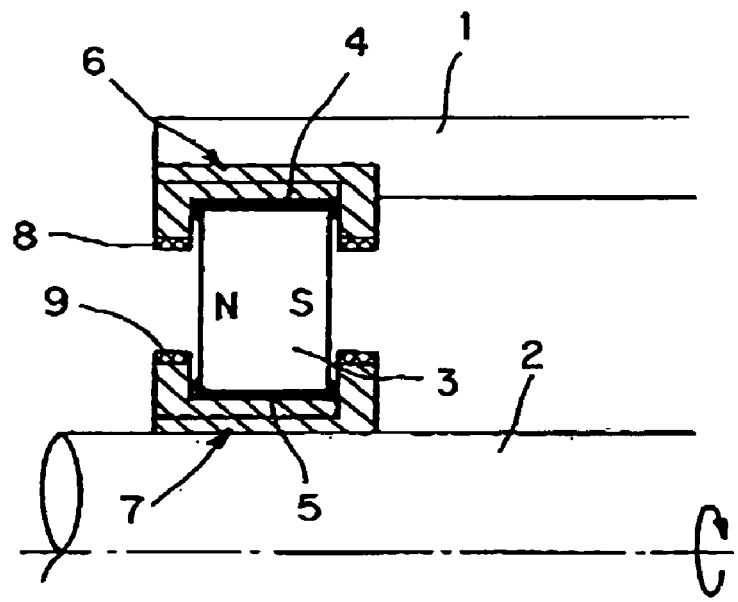
FIGS. 11 are a half cross-sectional view illustrating a magnetic fluid seal device in accordance with an eleventh embodiment and views illustrating magnetized states of an annular magnet.
Figure 11:
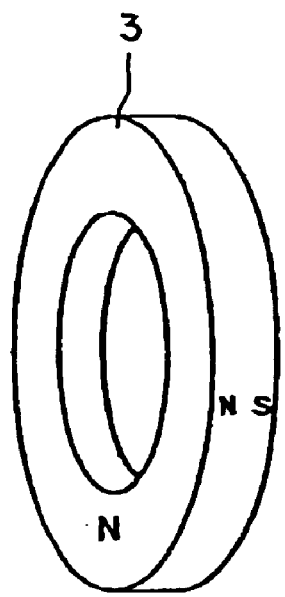
Figure 11:
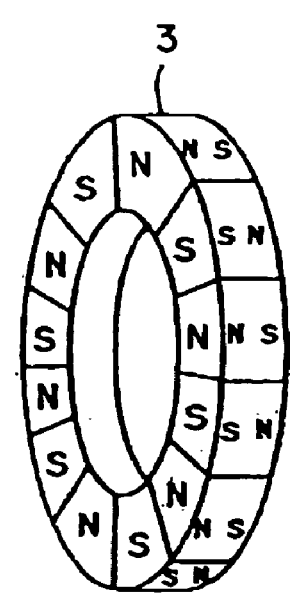

FIG. 11 illustrate a magnetic fluid seal device in accordance with an eleventh embodiment. The eleventh embodiment is one in which, in the first embodiment, the sleeves 6 and 7 are each configured by two divided cross-sectionally L-shaped members. Other configurations are the same as those of the first embodiment.

As illustrated in FIG. 11(a), in this embodiment, the sleeves 6 and 7 are each configured by two divided cross-sectionally L-shaped members. The two cross-sectionally L-shaped members comprise an axial-direction portion and a projecting portion that projects in the radial direction at the opposite end at the axial direction, and one sleeve 6 and 7 is formed by superposing the axial-direction portions of the two cross-sectionally L-shaped members.

Here, because the cross-sectionally L-shaped members at the right side of the drawing are fitted first and then the cross-sectionally L-shaped members at the left side of the drawing are superposed thereon, the device can be easily configured by carrying out in advance the disposition of the annular magnet 3 and the filling of the magnetic fluids 4 and 5 at the cross-sectionally L-shaped members at the left side of the drawing. Alternatively, the annular magnet 3 can be inserted within the cross-sectionally L-shaped members at the left side of the drawing, the cross-sectionally L-shaped members at the right side of the drawing can then be superposed thereon, and the magnetic fluids 4 and 5 can be filled in, so that it can be fitted to the device in a state in which the device is assembled as a seal device.

Magnetized patterns of the annular magnet 3 in this case are respectively illustrated in FIGS. 11(b) and 11(c). FIG. 11(b) illustrates a unipolarly magnetized annular magnet 3, and FIG. 11(c) illustrates a multipolarly magnetized annular magnet 3. These annular magnets 3 include poles lined in the axial direction.

Thus, it becomes easy to dispose the annular magnet 3 into the grooves of the sleeves 6 and 7. Also, because the device can be configured even if structural parts such as the annular magnet 3 and the sleeves 6 and 7 do not have an elastic deformation characteristic, the degree of freedom with which materials can be selected is increased.

TWELFTH EMBODIMENT

Figure 12:
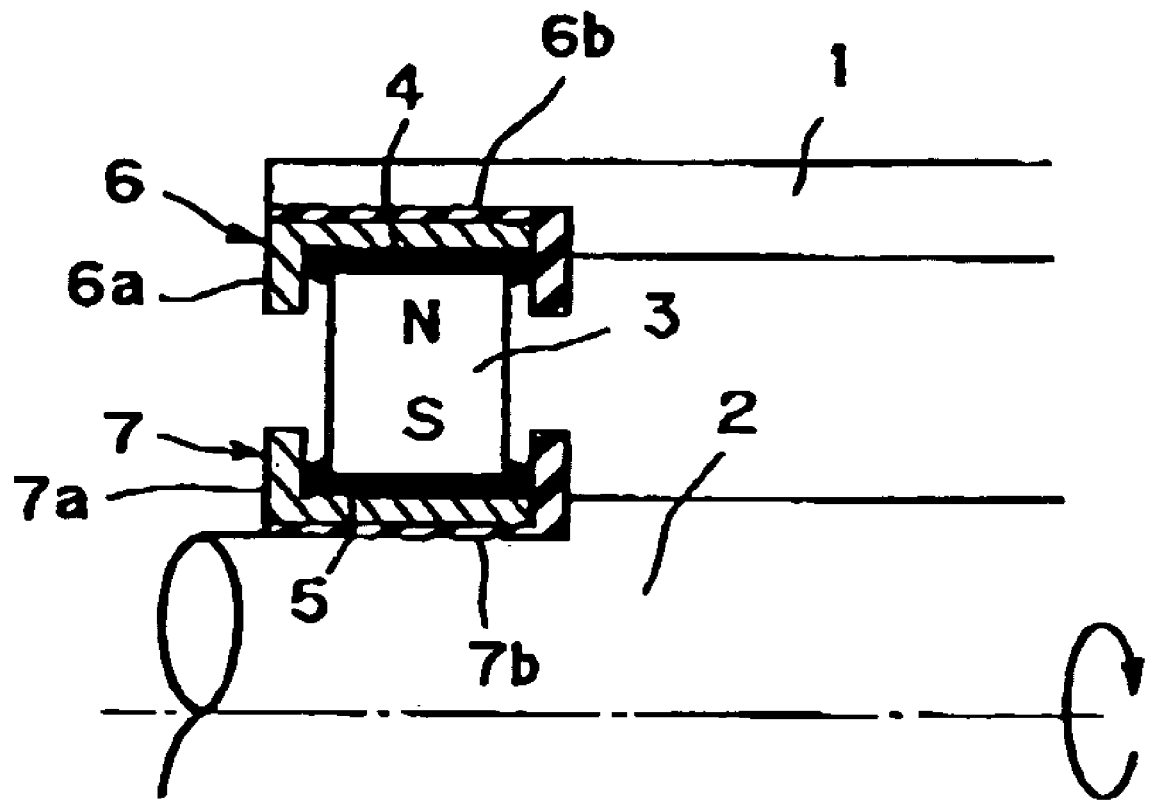
FIG. 12 is a half cross-sectional view illustrating a magnetic fluid seal device in accordance with a twelfth embodiment.

FIG. 12 illustrates a magnetic fluid seal device in accordance with a twelfth embodiment. The twelfth embodiment is one in which, in the first embodiment, the sleeves 6 and 7 are each configured by a rigid portion and a rubber portion. Other configurations are the same as those of the first embodiment.

In the present embodiment, the sleeve 6 is configured by a rigid portion 6a and a rubber portion 6b. The sleeve 7 is configured by a rigid portion 7a and a rubber portion 7b.

The rigid portions 6a and 7a are cross-sectionally L shapes that include an axial-direction portion and a projecting portion that projects at the left side of the axial-direction portion in the drawing.

The rubber portions 6b and 7b are cross-sectionally L shapes that include an axial-direction portion, which fits together with the housing 1 or the shaft 2, and a projecting portion, which projects at the right side of the axial-direction portion in the drawing. The rubber portions 6b and 7b are rubber-like elastic bodies that are easily deformed.

The sleeves 6 and 7 can be easily configured by superposing the axial-direction portions of the rubber portions 6b and 7b on the axial-direction portions of the rigid portions 6a and 7a.

In this configuration, the sleeves 6 and 7 are configured in advance, the annular magnet 3 is inserted by bending the projecting portions of the rubber portions 6b and 7b of the configured sleeves 6 and 7, and thereafter the magnetic fluids 4 and 5 are filled in.

After the seal device has been completed by the insertion of the annular magnet 3 into the sleeves 6 and 7 and the filling of the magnetic fluids 4 and 5, the device is fitted by respectively fitting the axial-direction portions of the rubber portions 6b and 7b of the sleeves 6 and 7 together with the housing 1 or the shaft 2.

Thus, the annular magnet 3 can be inserted by bending the projecting portions of the rubber portions 6b and 7b of the sleeves 6 and 7, so that is becomes easy to dispose the annular magnet 3 into the grooves of the sleeves 6 and 7.

Also, the axial-direction portions of the rubber portions 6b and 7b can be respectively fitted to the housing 1 or the shaft 2, so that adhesion becomes unnecessary in the fitting together of both.

THIRTEENTH EMBODIMENT

Figure 13:
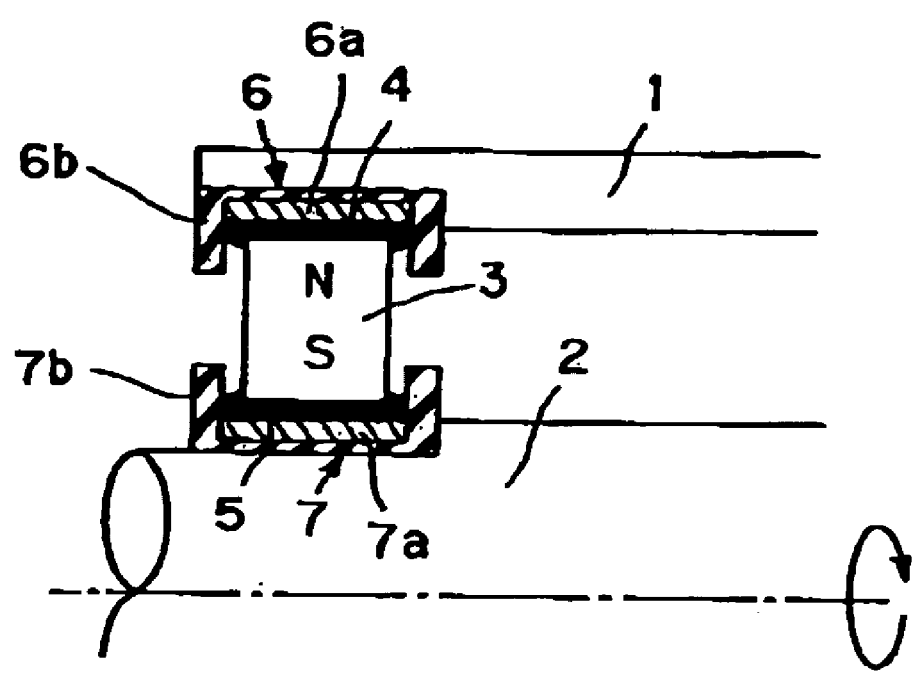
FIG. 13 is a half cross-sectional view illustrating a magnetic fluid seal device in accordance with a thirteenth embodiment.

FIG. 13 illustrates a magnetic fluid seal device in accordance with a thirteenth embodiment. The thirteenth embodiment is one in which, similar to the twelfth embodiment, in the first embodiment, the sleeves 6 and 7 are each configured by the rigid portion and the rubber portion. Other configurations are the same as those of the first embodiment.

In the present embodiment, the sleeve 6 is configured by the rigid portion 6a and the rubber portion 6b. The sleeve 7 is configured by the rigid portion 7a and the rubber portion 7b.

The rigid portions 6a and 7a are cylindrical shapes comprising axial-direction portions that contact the magnetic fluids 4 and 5.

The rubber portions 6b and 7b include an axial-direction portion, which is fitted together with the housing 1 or the shaft 2, and a projecting portion, which projects at the left and right sides of the axial-direction portion in the drawing. The rubber portions 6b and 7b are rubber-like elastic bodies that are easily deformed.

The sleeves 6 and 7 can be easily configured by superposing the rigid portions 6a and 7a within the axial-direction portions of the rubber portions 6b and 7b.

In this configuration, the sleeves 6 and 7 are configured in advance, the annular magnet 3 is inserted by bending the projecting portions of the rubber portions 6b and 7b of the configured sleeves 6 and 7, and thereafter the magnetic fluids 4 and 5 are filled in.

After the seal device has been completed by the insertion of the annular magnet 3 into the sleeves 6 and 7 and the filling of the magnetic fluids 4 and 5, the device is fitted by respectively fitting the axial-direction portions of the rubber portions 6b and 7b of the sleeves 6 and 7 together with the housing 1 or the shaft 2.

Thus, the annular magnet 3 can be inserted by bending the projecting portions of the rubber portions 6b and 7b of the sleeves 6 and 7, so that is becomes easy to dispose the annular magnet 3 into the grooves of the sleeves 6 and 7.

Also, the axial-direction portions of the rubber portions 6b and 7b can be respectively fitted to the housing 1 or the shaft 2, so that adhesion becomes unnecessary in the fitting together of both.

FOURTEENTH EMBODIMENT

Figure 14:
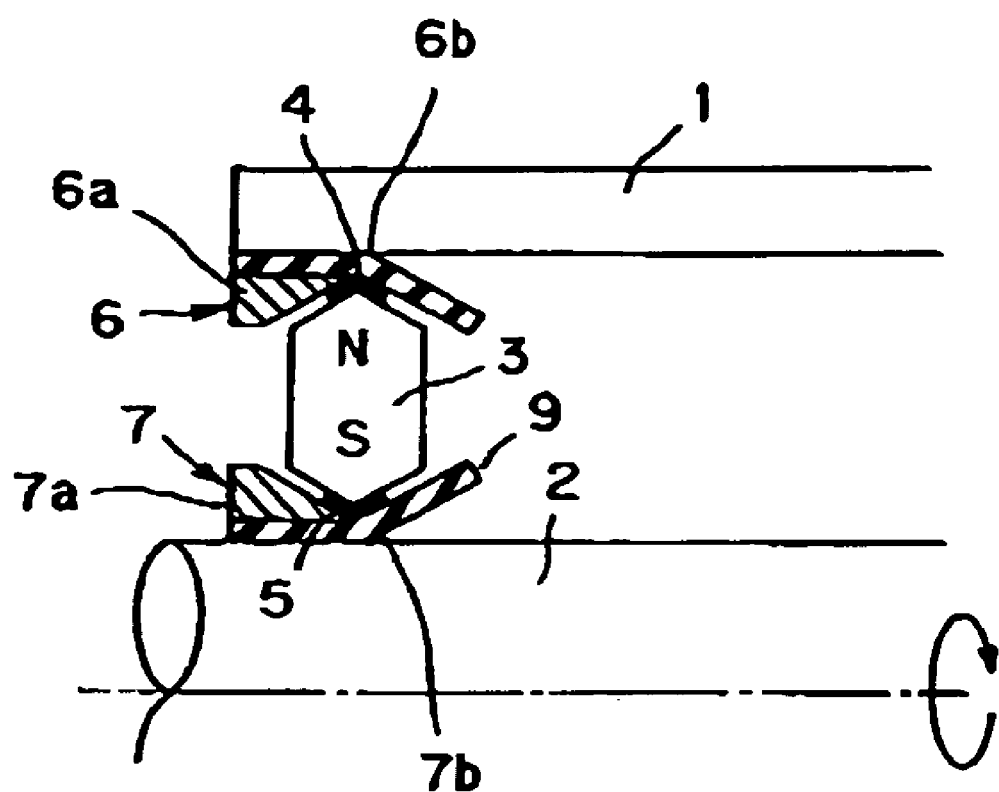
FIG. 14 is a half cross-sectional view illustrating a magnetic fluid seal device in accordance with a fourteenth embodiment.

FIG. 14 illustrates a magnetic fluid seal device in accordance with a fourteenth embodiment. The fourteenth embodiment is one in which, similar to the twelfth and thirteenth embodiments, in the first embodiment, the sleeves 6 and 7 are each configured by the rigid portion and the rubber portion. Also, the shapes of the annular magnet 3 and the sleeves 6 and 7 have been deformed in order to reduce the filling amount of the magnetic fluids 3 and 4. Other configurations are the same as those of the first embodiment.

In the present embodiment, ends of the annular magnet 3 opposing the housing 1 and the shaft 2 are pointed in a protruding shape that is cross-sectionally triangular, and magnetic flux is concentrated at and the magnetic fluids 4 and 5 are magnetically held at the pointed tips.

The sleeve 6 is configured by the rigid portion 6a and the rubber portion 6b. The sleeve 7 is configured by the rigid portion 7a and the rubber portion 7b.

The grooves of the sleeves 6 and 7 are cross-sectionally triangular grooves that match the cross-sectionally triangular ends of the annular magnet 3 that are pointed in a protruding manner and face the housing 1 and the shaft 2.

The rigid portions 6a and 7a form tapers at one side and configure groove wall surfaces of the sleeves 6 and 7 at the left side of the drawing.

The rubber portions 6b and 7b include an axial-direction portion, which fits together with the housing 1 or the shaft 2, and a projecting portion, which projects and forms a groove wall surface of the sleeves 6 and 7 at the right side of the axial-direction portion in the drawing. The rubber portions 6b and 7b are rubber-like elastic bodies that are easily deformed.

The sleeves 6 and 7 can be easily configured by superposing the rigid portions 6a and 7a within the axial-direction portions of the rubber portions 6b and 7b.

In this configuration, the sleeves 6 and 7 are configured in advance, the annular magnet 3 is inserted by bending the projecting portions of the rubber portions 6b and 7b of the configured sleeves 6 and 7, and thereafter the magnetic fluids 4 and 5 are filled in.

After the seal device has been completed by the insertion of the annular magnet 3 into the sleeves 6 and 7 and the filling of the magnetic fluids 4 and 5, the device is fitted by respectively fitting the axial-direction portions of the rubber portions 6b and 7b of the sleeves 6 and 7 together with the housing 1 or the shaft 2.

Thus, the annular magnet 3 can be inserted by bending the projecting portions of the rubber portions 6b and 7b of the sleeves 6 and 7, so that is becomes easy to dispose the annular magnet 3 into the grooves of the sleeves 6 and 7.

Also, because the magnetic flux is concentrated at and the magnetic fluids 4 and 5 are magnetically retained at the pointed tips of the annular magnet 3 that oppose the housing 1 and the shaft 2 and are pointed in a protruding shape that is triangular in cross section, the magnetic fluids 4 and 5 are efficiently concentrated and retained without being dispersed. Thus, the magnetic fluid filling amount can be reduced.

Moreover, the axial-direction portions of the rubber portions 6b and 7b can be respectively fitted together with the housing 1 or the shaft 2, so that adhesion becomes unnecessary in the fitting together of both.

FIFTEENTH EMBODIMENT

Figure 15:
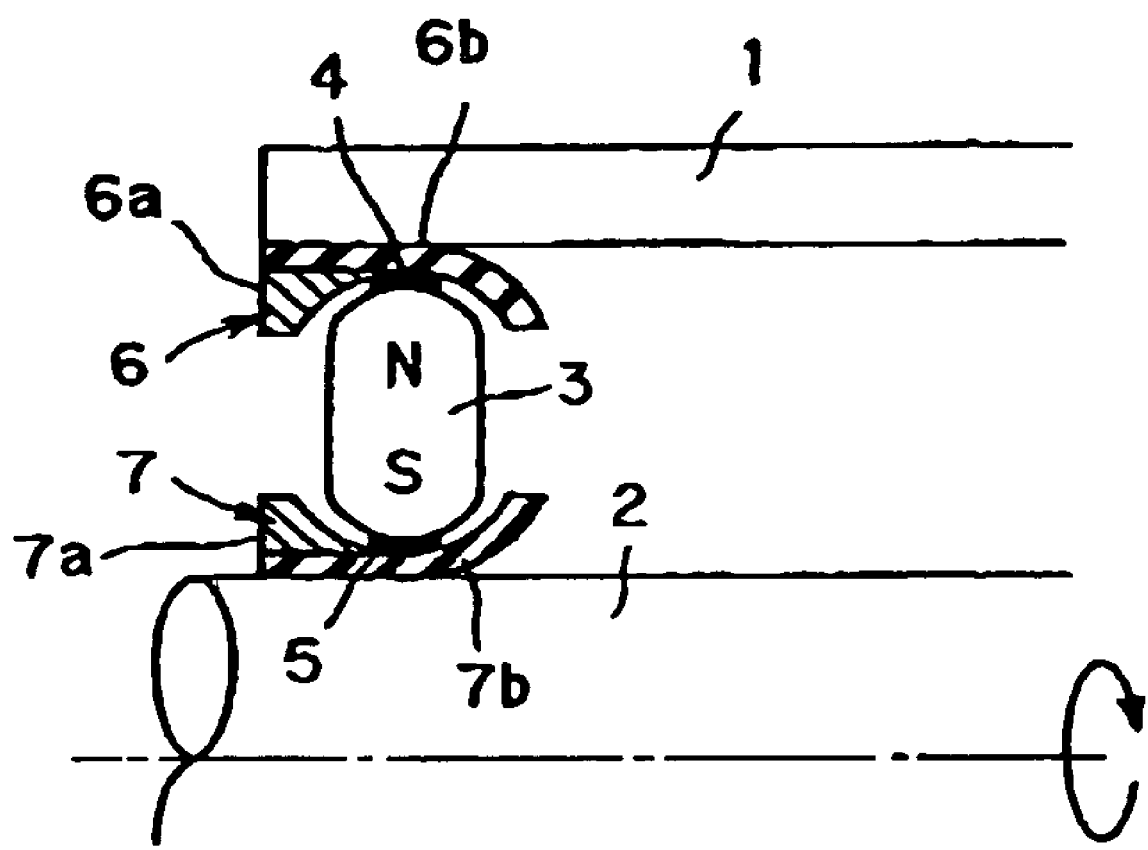
FIG. 15 is a half cross-sectional view illustrating a magnetic fluid seal device in accordance with a fifteenth embodiment.

FIG. 15 illustrates a magnetic fluid seal device in accordance with a fifteenth embodiment. The fifteenth embodiment is one in which, similar to the twelfth, thirteenth, and fourteenth embodiments, in the first embodiment, the sleeves 6 and 7 are each configured by the rigid portion and the rubber portion. Also, similar to the fourteenth embodiment, the shapes of the annular magnet 3 and the sleeves 6 and 7 have been deformed in order to reduce the filling amount of the magnetic fluids 3 and 4. Other configurations are the same as those of the first embodiment.

In the present embodiment, ends of the annular magnet 3 opposing the housing 1 and the shaft 2 are pointed in a protruding shape that is cross-sectionally arced, and magnetic flux is concentrated at and the magnetic fluids 4 and 5 are magnetically held at the pointed tips.

The sleeve 6 is configured by the rigid portion 6a and the rubber portion 6b. The sleeve 7 is configured by the rigid portion 7a and the rubber portion 7b.

The grooves of the sleeves 6 and 7 are cross-sectionally arced grooves that match the cross-sectionally arced ends of the annular magnet 3 that are pointed in a protruding manner and oppose the housing 1 and the shaft 2.

The gaps between the grooves of the sleeves 6 and 7 and the cross-sectionally arced ends of the annular magnet 3 that are pointed in a protruding manner narrow toward tips of the cross-sectionally arced ends of the annular magnet 3 that are pointed in a protruding manner.

The rigid portions 6a and 7a form cross-sectionally arced tapers at one side and configure groove wall surfaces of the sleeves 6 and 7 at the left side of the drawing.

The rubber portions 6b and 7b include an axial-direction portion, which fits together with the housing 1 or the shaft 2, and a projecting portion, which projects and configures a groove wall surface of the sleeves 6 and 7 at the right side of the axial-direction portion in the drawing. The rubber portions 6b and 7b are rubber-like elastic bodies that are easily deformed.

The sleeves 6 and 7 can be easily configured by superposing the rigid portions 6a and 7a within the axial-direction portions of the rubber portions 6b and 7b.

In this configuration, the sleeves 6 and 7 are configured in advance, the annular magnet 3 is inserted by bending the projecting portions of the rubber portions 6b and 7b of the configured sleeves 6 and 7, and thereafter the magnetic fluids 4 and 5 are filled in.

After the seal device has been completed by the insertion of the annular magnet 3 into the sleeves 6 and 7 and the filling of the magnetic fluids 4 and 5, the device is fitted by respectively fitting the axial-direction portions of the rubber portions 6b and 7b of the sleeves 6 and 7 together with the housing 1 or the shaft 2.

Thus, the annular magnet 3 can be inserted by bending the projecting portions of the rubber portions 6b and 7b of the sleeves 6 and 7, so that is becomes easy to dispose the annular magnet 3 into the grooves of the sleeves 6 and 7.

Also, because the magnetic flux is concentrated at and the magnetic fluids 4 and 5 are magnetically held at the pointed tips of the annular magnet 3 that oppose housing 1 and the shaft 2 and are pointed in a protruding shape that is cross-sectionally arced, the magnetic fluids 4 and 5 are efficiently concentrated and retained without being dispersed. Thus, the magnetic fluid filling amount can be reduced.

Because the gaps between the grooves of the sleeves 6 and 7 and the cross-sectionally arced ends of the annular magnet 3 that are pointed in a protruding manner narrow toward tips of the cross-sectionally arced ends of the annular magnet 3 that are pointed in a protruding manner, it becomes easy for the magnetic fluids 4 and 5 to be concentrated at the narrowest portion of the gaps, and the magnetic fluid filling amount can be further reduced.

Moreover, the axial-direction portions of the rubber portions 6b and 7b can be respectively fitted together with the housing 1 or the shaft 2, so that adhesion becomes unnecessary in the fitting together of both.

SIXTEENTH EMBODIMENT

Figure 16:
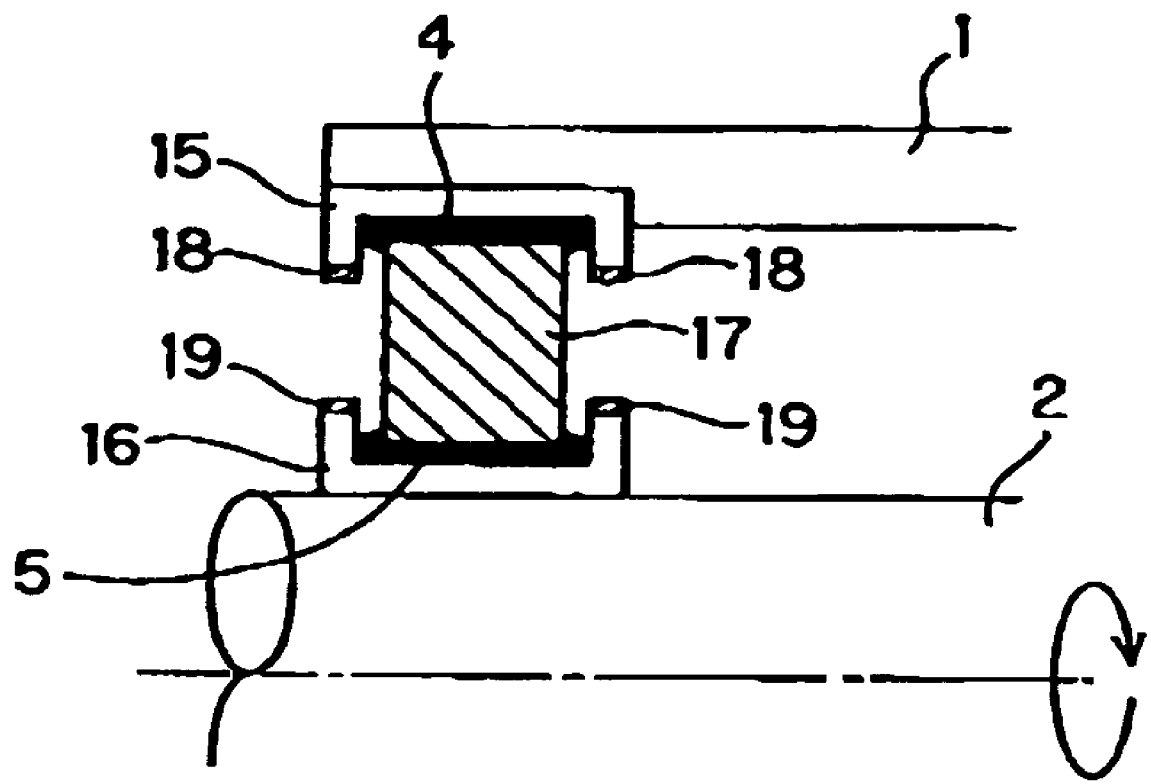
FIG. 16 is a half cross-sectional view illustrating a magnetic fluid seal device in accordance with a sixteenth embodiment.

The configuration of a magnetic fluid seal device in accordance with a sixteenth embodiment will be described using FIG. 16. FIG. 16 is a half cross-sectional view illustrating the magnetic fluid seal device in accordance with the sixteenth embodiment.

The embodiment below is one in which a nonmagnetic member is magnetically floated in consideration of the fact that, in the first to fifteenth embodiments, there is a limit on increasing diameter in that the force of buoyancy of the annular magnet becomes smaller than the force of gravity of the annular magnet when the axial diameter becomes large.

The magnetic fluid seal device illustrated in FIG. 16 is disposed between the cylindrical housing 1 and the shaft 2 inserted into the housing 1, which serve as two rotatably movable members. Relative rotational movement is conducted between the housing 1 and the shaft 2, and, in the present embodiment, only the shaft 2 rotates. The housing 1 and the shaft 2 are configured by nonmagnetic materials.

The magnetic fluid seal device includes sleeve-like magnets 15 and 16 (sleeve-like magnetic force generating means), which are respectively fitted together with the housing 1 and the shaft 2, a nonmagnetic member 17, which is disposed between the housing 1 and the shaft 2, and the magnetic fluids 4 and 5, which are respectively retained at the inner and outer peripheries of the sleeve-like magnets 15 and 16.

A magnetic field gradient is generated near an inner peripheral surface of the sleeve-like magnet 15 and the outer peripheral surface of the sleeve-like magnet 16, the magnetic fluids 4 and 5 disposed inside that magnetic field gradient are sucked in toward the upper magnetic field (magnet surfaces), and, as a reaction force against it, the nonmagnetic member 17 receives a repulsive force toward the lower magnetic field. As a result, the nonmagnetic member 17 floats in the magnetic fluids 4 and 5 in a state in which it does not contact the sleeve-like magnets 15 and 16, and, at the same time, the magnetic fluids 4 and 5 fulfill the function of sealing the gaps between the nonmagnetic member 17 and the sleeve-like magnets 15 and 16.

It is preferable to use, as the material for the sleeve-like magnets 15 and 16, a rubber magnet or the like that has flexibility. Any method (direction, pole number) may be used for the magnetization of the sleeve-like magnets 15 and 16 as long as it satisfies the condition that the nonmagnetic member 17 floats in the magnetic fluids 4 and 5 in a state in which it does not contact the sleeve-like magnets 15 and 16.

As the magnetic fluids 4 and 5, a fluid is used in which fine particles of $Fe_3O_4$, $Mn.ZnFe_2O_4$, etc. are dispersed in colloid form in oil, water, an organic solvent, etc.

As the material of the nonmagnetic member 17, a nonmagnetic metal, such as nonmagnetic stainless steel, an aluminum alloy, a copper alloy, or a titanium alloy, or a resin, such as polyphenylene oxide, polycarbonate, or polyacetal, is preferable.

Center portions of the sleeve-like magnets 15 and 16 are recessed to form grooves, so that projecting portions project at both axial-direction end portions, and inner and outer peripheral end portions of the nonmagnetic member 17 have gaps that are respectively disposed in the grooves. The magnetic fluids 4 and 5 are filled into the gaps between inner and outer peripheral ends of the nonmagnetic member 17 and the grooves of the sleeve-like magnets 15 and 16.

The sleeve-like magnets 15 and 16 have an elastic deformation characteristic that enables the nonmagnetic member 17 to be inserted into the grooves of the sleeve-like magnets 15 and 16, so that smooth fitting of the nonmagnetic member 17 is possible.

When a sintered metallic material that does not have flexibility but has a strong magnetic force is used for the sleeve-like magnets 15 and 16, it is preferable to use a material that has flexibility, such as resin or rubber, for the nonmagnetic member 17.

Oil-repellant films 18 and 19 are formed on surfaces of the projecting portions (i.e., the portions other than the inner grooves of the surface opposing the nonmagnetic member 17) of both axial-direction end portions of the sleeve-like magnets 15 and 16. The magnetic fluids 4 and 5 within the grooves of the sleeve-like magnets 15 and 16 are prevented from spreading to the outside by the oil-repellant films 18 and 19.

As processes for forming the oil-repellant films 18 and 19, there are processes by coating, application, and the like other than film formation, and a material such as a fluorine oil-repellant agent is used.

The above magnetic fluid seal device is easily fitted with one touch between the housing 1 and the shaft 2 in a state in which the magnetic fluids 4 and 5 have been pre-filled between the nonmagnetic member 17 and the sleeve-like magnets 15 and 16.

In the magnetic fluid seal device, the nonmagnetic member 17 is buoyantly supported by the magnetic fluids 4 and 5 retained by the sleeve-like magnets 15 and 16, and the nonmagnetic member 17 floats regardless of the orientation with which the device is disposed.

The space between the housing 1 and the shaft 2 is sealed by the nonmagnetic member 17 and the magnetic fluids 4 and 5. As a result, the function that seals the shaft 2 with respect to the housing 1 can be exhibited by the eccentricity of the sum of the two gaps between the inner and outer peripheral surfaces of the nonmagnetic member 17 and the sleeve-like magnets 15 and 16.

Therefore, because the magnetic fluid seal device has a configuration including gaps that retain the magnetic fluids 4 and 5 at both the inner and outer peripheries of the nonmagnetic member 17, the sum of both gaps becomes the tolerance of coaxiality of the housing 1 and the shaft 2, and sealability can be exhibited even when precision is low.

Because the nonmagnetic member 17 floats with the magnetic force due to the magnetic fluids 4 and 5 that the sleeve-like magnets 15 and 16 retain, the magnetic seal fluid device also exhibits a function as a rotation inertia damper using the nonmagnetic member 17 as an inertial body and using the magnetic fluids 4 and 5 as viscous damping means.

Also, in regard to the members used in the magnetic fluid seal device, because there are no members such as pole pieces and only the nonmagnetic member 17 requires thickness, the structural members can be reduced and the device can be thinned. Manufacture also becomes easy because there is no need to join members with each other including members such as the pole pieces.

Moreover, because the inner and outer peripheral end portions of the nonmagnetic member 17 are disposed in the grooves of the sleeve-like magnets 15 and 16, the device can be fitted in a state in which the magnetic fluids 4 and 5 have been filled in advance in the device, the fitting becomes easy, and management of the magnetic fluid filling amount becomes easy.

In contrast to the first to fifteenth embodiments, in which an annular magnet is magnetically floated, the nonmagnetic member 17 can be made thin and light without changing the magnetic force because the nonmagnetic member is magnetically floated. Thus, the nonmagnetic member 17 can be magnetically floated even if the diameter of the device is made larger in a case where the axial diameter becomes large.

It should be noted that the magnetized direction of the sleeve-like magnets in the present embodiment and in the embodiments below may be either the radial direction or the axial direction.

SEVENTEENTH EMBODIMENT

Figure 17:
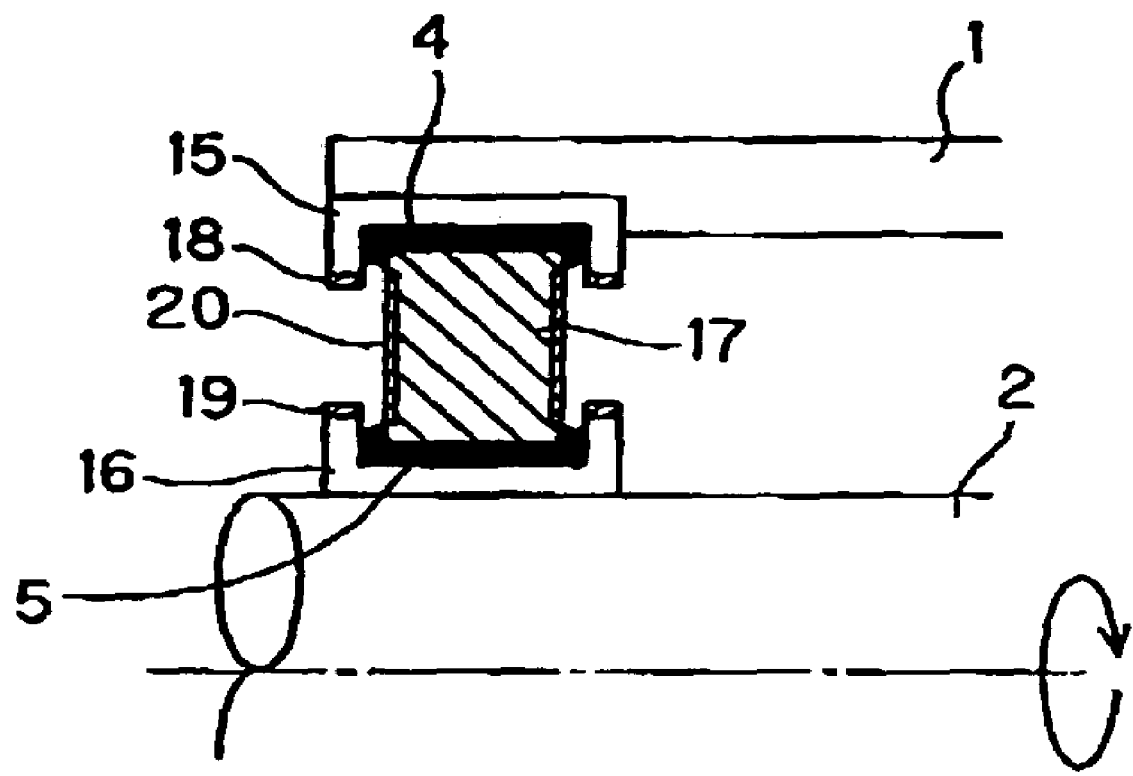
FIG. 17 is a half cross-sectional view illustrating a magnetic fluid seal device in accordance with a seventeenth embodiment.

FIG. 17 illustrates a magnetic fluid seal device in accordance with a seventeenth embodiment. The seventeenth embodiment is one in which an oil-repellant film 20 is formed on a radial-direction side surface of the nonmagnetic member 17. Other configurations are the same as those of the sixteenth embodiment.

The oil-repellant film 20 is formed on the portion of the nonmagnetic member 17 that does not contact the magnetic fluids 4 and 5 (i.e., on the radial-direction side surface of the nonmagnetic member 17 excluding corner portions).

The oil-repellant film 20 is not formed on the corner portions of the radial-direction side surface of the nonmagnetic member 17, and the corner portions relate to the seal and magnetic buoyancy due to the adhesion of the magnetic fluids 4 and 5.

Thus, the magnetic fluids 4 and 5 do not spread on the radial-direction side surface of the nonmagnetic member 17, a reduction in the magnetic fluid amount necessary for the seal can be prevented, and the sealing function can be exhibited with respect to any orientation with an even less magnetic fluid filling amount that is filled in advance.

EIGHTEENTH EMBODIMENT

Figure 18:
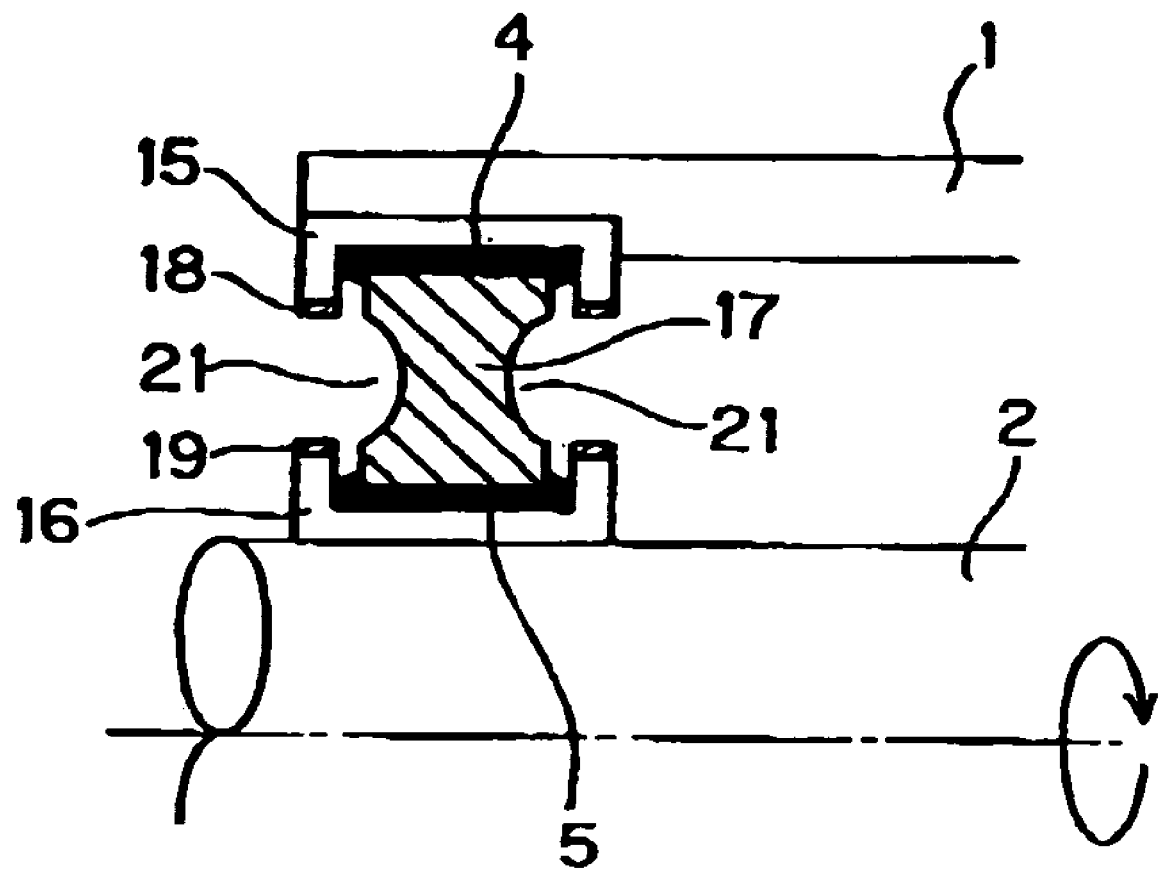
FIG. 18 is a half cross-sectional view illustrating a magnetic fluid seal device in accordance with an eighteenth embodiment.

FIG. 18 illustrates a magnetic fluid seal device in accordance with an eighteenth embodiment. The eighteenth embodiment is one in which a cutout portion 21 is formed in the radial-direction side surface of the nonmagnetic member 17. Other configurations are the same as those of the sixteenth embodiment.

The cutout portion 21 is formed in the portion of the nonmagnetic member 17 that does not contact the magnetic fluids 4 and 5 (i.e., in the radial-direction side surface of the nonmagnetic member 17 excluding corner portions and extending between the housing 1 and the shaft 2).

Thus, weight reduction of the nonmagnetic member 17 is improved, and the nonmagnetic member 17 can float with respect to any orientation with an even less magnetic fluid filling amount or with magnetic fluids 4 and 5 of an even lower saturation magnetization.

NINETEENTH EMBODIMENT

Figure 19:
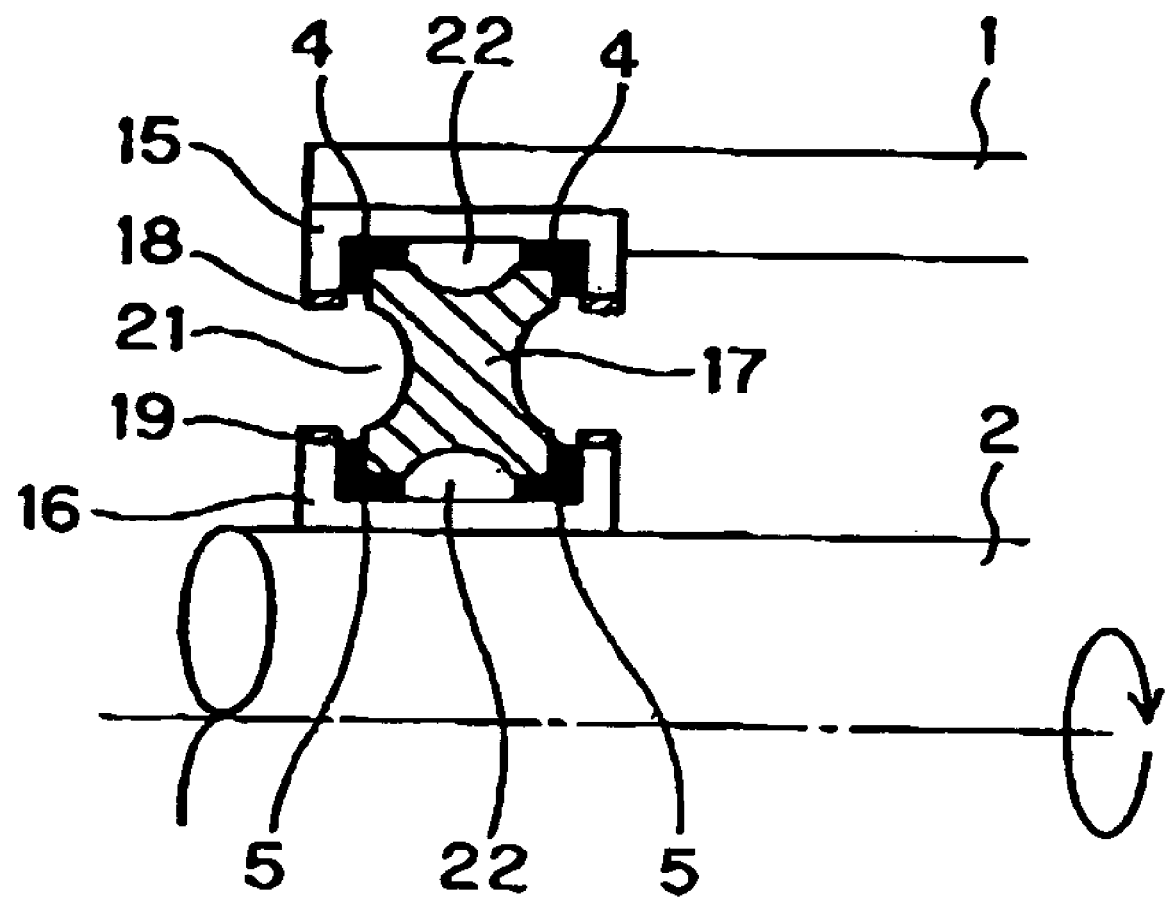
FIG. 19 is a half cross-sectional view illustrating a magnetic fluid seal device in accordance with a nineteenth embodiment.

FIG. 19 illustrates a magnetic fluid seal device in accordance with a nineteenth embodiment. The nineteenth embodiment is one in which cutout portions 22 are formed in center portions of the inner and outer peripheral surfaces, in addition to the cutout portion 21 in the radial-direction side surface of the nonmagnetic member 17. Other configurations are the same as those of the sixteenth embodiment.

Similar to the third embodiment, the cutout portion 21 is formed in the portion of the nonmagnetic member 17 that does not contact the magnetic fluids 4 and 5 (i.e., in the radial-direction side surface of the nonmagnetic member 17 excluding corner portions and extending between the housing 1 and the shaft 2).

In addition, the cutout portions 22 are formed in the center portions of the inner and outer peripheral surfaces opposing the housing 1 or the shaft 2 excluding the corner portions of the nonmagnetic member 17.

Thus, weight reduction of the nonmagnetic member 17 is improved, and the nonmagnetic member 17 can float with respect to any orientation with an even less magnetic fluid filling amount or with magnetic fluids 4 and 5 of an even lower saturation magnetization.

TWENTIETH EMBODIMENT

Figure 20:
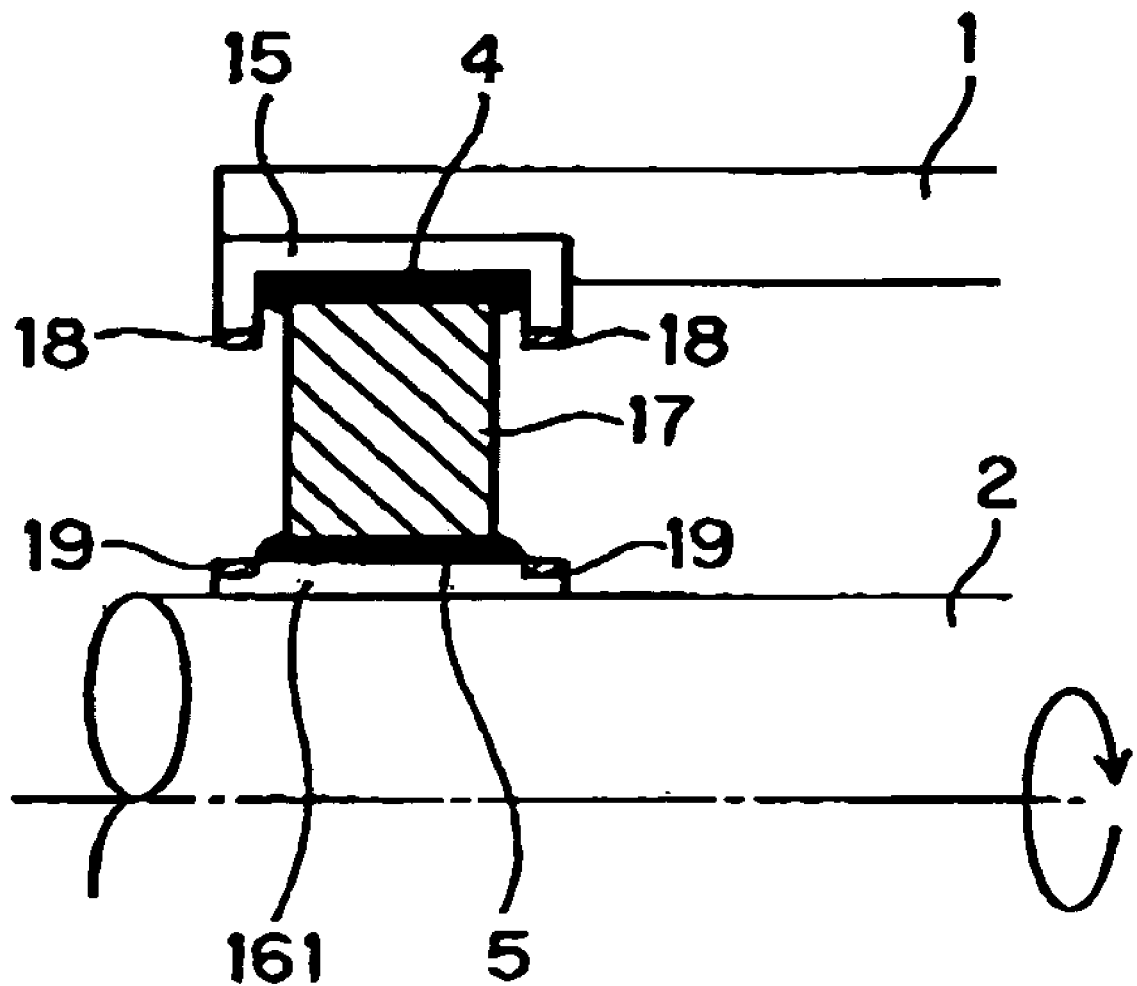
FIG. 20 is a half cross-sectional view illustrating a magnetic fluid seal device in accordance with a twentieth embodiment.

FIG. 20 illustrates a magnetic fluid seal device in accordance with a twentieth embodiment. The twentieth embodiment is one in which no groove is formed in a sleeve-like magnet 161 fitted together with the shaft 2 and in which the oil-repellant film 19 is formed at both axial-direction end portions of opposing surfaces opposing the nonmagnetic member 17. Other configurations are the same as those of the sixteenth embodiment.

The sleeve-like magnet 161 fitted together with the shaft 2 is a cylindrical shape that does not have formed therein a groove such as the one in the eleventh embodiment. The oil-repellant film 19 is formed at the axial-direction end portions of opposing surfaces opposing the nonmagnetic member 17.

In this configuration also, the magnetic fluid 5 is retained on the sleeve-like magnet 161, the nonmagnetic member 17 floats with a magnetic force with respect to any orientation and functions as a dust seal with respect to the rotation of the shaft 2.

It should be noted that, as an alternative to the present embodiment, similar effects can be obtained by not forming the groove in the sleeve-like magnet of the housing 1 and forming the oil-repellant film 18 at both axial-direction end portions of opposing surfaces opposing the nonmagnetic member 17.

TWENTY-FIRST EMBODIMENT

Figure 21:
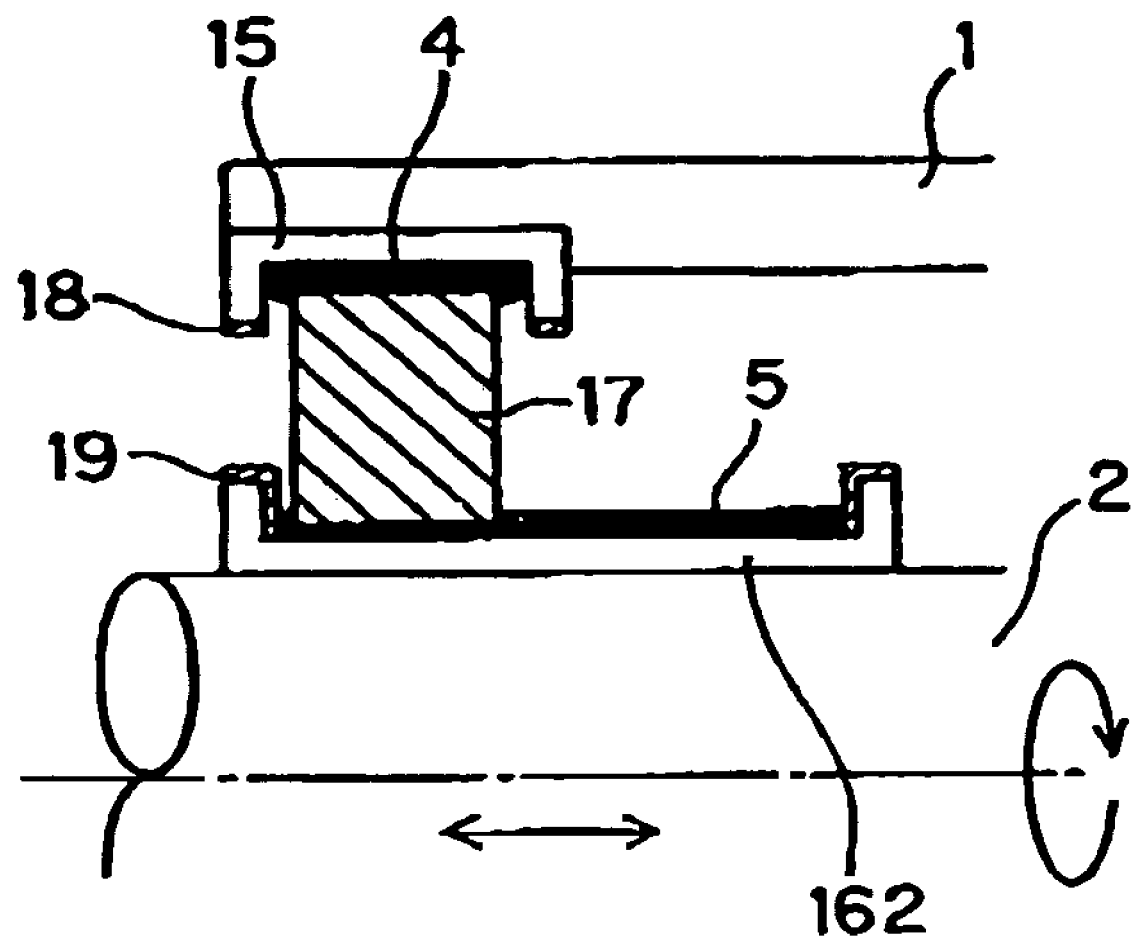
FIG. 21 is a half cross-sectional view illustrating a magnetic fluid seal device in accordance with a twenty-first embodiment.

FIG. 21 illustrates a magnetic fluid seal device in accordance with a twenty-first embodiment. The twenty-first embodiment is one in which relative reciprocal movement is conducted between the housing 1 and the shaft 2, and a sleeve-like magnet 162 fitted together with the shaft 2 is extended in the axial direction to a reciprocal movement length. Other configurations are the same as those of the sixteenth embodiment.

In the present embodiment, not only is relative rotational movement conducted between the housing 1 and the shaft 2, but relative reciprocal movement is also conducted between the housing 1 and the shaft 2, and, in the present embodiment, the shaft 2 reciprocally moves.

Thus, it is necessary to float the nonmagnetic member 17 by retaining the magnetic fluid 5 at the entire planar portion on the sleeve-like magnet 162, stabilize and support the magnetic fluid seal device, and, in the present embodiment, the device has a configuration in which the sleeve-like magnet 162 fitted together with the shaft 2 is extended in the axial direction to the length at which the shaft 2 reciprocally moves, and the magnetic fluid 5 on the sleeve-like magnet 162 is retained at the entire planar portion.

In this instance, in order to prevent the magnetic fluid 5 from spreading onto the sleeve-like magnet 162, the oil-repellant film 19 is formed at both axial-direction end portions of the sleeve-like magnet 162 fitted together with the shaft 2.

In this configuration also, the nonmagnetic member 17 floats with a magnetic force with respect to any orientation, and functions as a dust seal with respect to the rotational/reciprocal movement of the shaft 2. The present embodiment is, of course, also suited for a case where the shaft 2 only carries out reciprocal movement.

It should be noted that, as an alternative to the present embodiment, similar effects can be obtained by extending the sleeve-like magnet of the housing 1 in the axial direction to the reciprocal movement length and retaining the magnetic fluid at the opposing surface opposing the nonmagnetic member 17.

TWENTY-SECOND EMBODIMENT

Figure 22:
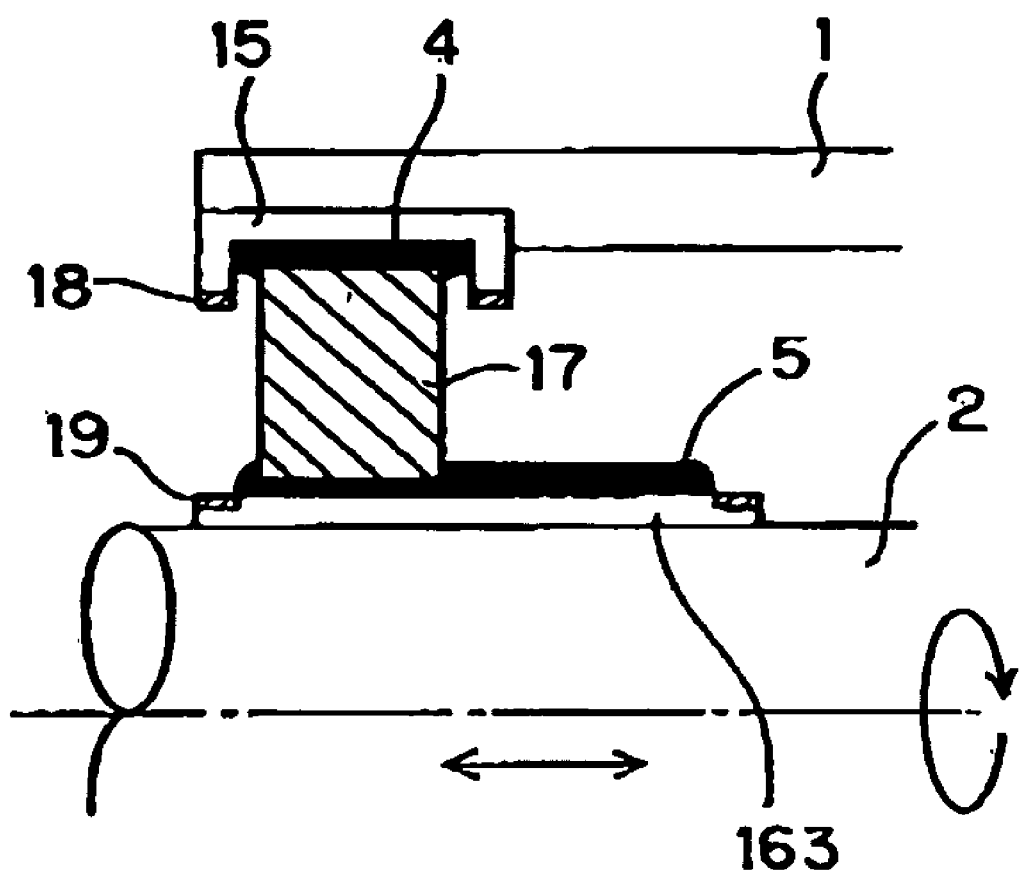
FIG. 22 is a half cross-sectional view illustrating a magnetic fluid seal device in accordance with a twenty-second embodiment.

FIG. 22 illustrates a magnetic fluid seal device in accordance with a twenty-second embodiment. The twenty-second embodiment is one in which relative reciprocal movement is conducted between the housing 1 and the shaft 2, a sleeve-like magnet 163 fitted together with the shaft 2 is extended in the axial direction to a reciprocal movement length without forming a groove in the sleeve-like magnet 163, the magnetic fluid 5 is retained at the planar portion excluding both axial-direction end portions of the opposing surface opposing the nonmagnetic member 17, and the oil-repellant film 19 is formed on both axial-direction end portions. Other configurations are the same as those of the sixteenth embodiment.

Similar to the twentieth embodiment, in the present embodiment, not only is relative rotational movement conducted between the housing 1 and the shaft 2, but relative reciprocal movement is also conducted between the housing 1 and the shaft 2, and, in the present embodiment, the shaft 2 reciprocally moves.

Thus, it is necessary to float the nonmagnetic member 17 by retaining the magnetic fluid 5 at the planar portion on the sleeve-like magnet 163 excluding both axial-direction end portions, stabilize and support the magnetic fluid seal device, and, in the present embodiment, the device has a configuration in which the sleeve-like magnet 163 fitted together with the shaft 2 is extended in the axial direction to the length at which the shaft 2 reciprocally moves, and the magnetic fluid 5 on the sleeve-like magnet 163 is retained at the planar portion excluding both axial-direction end portions.

In this instance, in order to prevent the magnetic fluid 5 from spreading onto the sleeve-like magnet 163, the oil-repellant film 19 is formed at both axial-direction end portions of the opposing surface opposing the nonmagnetic member 17 on the sleeve-like magnet 163 fitted together with the shaft 2.

Here, contrary to the twenty-first embodiment, the sleeve-like magnet 163 fitted together with the shaft 2 is a cylindrical shape that does not have formed therein a groove such as the one in the sixteenth embodiment.

In this configuration also, the nonmagnetic member 17 floats with a magnetic force with respect to any orientation, and functions as a dust seal with respect to the rotational/reciprocal movement of the shaft 2. The present embodiment is, of course, also suited for a case where the shaft 2 only carries out reciprocal movement.

It should be noted that, as an alternative to the present embodiment, similar effects can be obtained by extending the sleeve-like magnet of the housing 1 in the axial direction to the reciprocal movement length, and retaining the magnetic fluid at the opposing surface opposing the nonmagnetic member 17, without a groove such as the one in the sixteenth embodiment being formed.

TWENTY-THIRD EMBODIMENT

Figure 23:
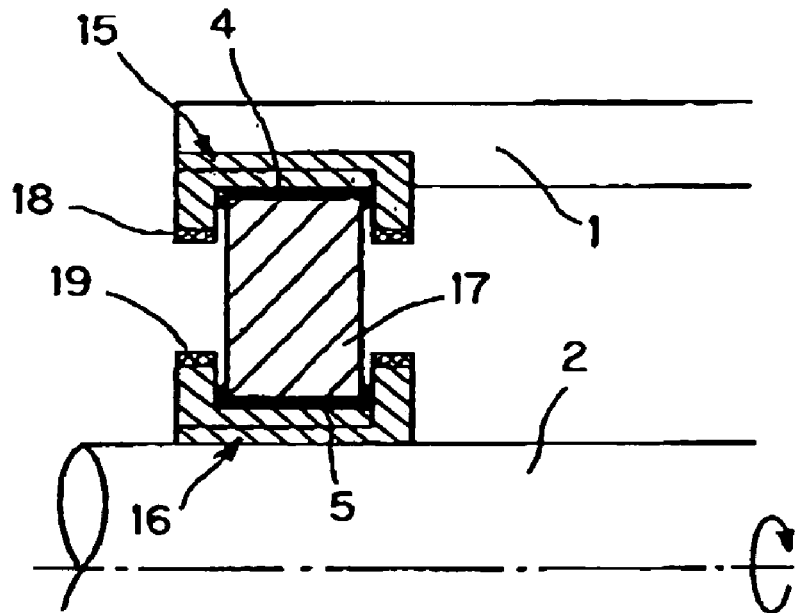
FIGS. 23 are a half cross-sectional view illustrating a magnetic fluid seal device in accordance with a twenty-third embodiment and views illustrating magnetized states of a sleeve-like magnet.
Figure 23:
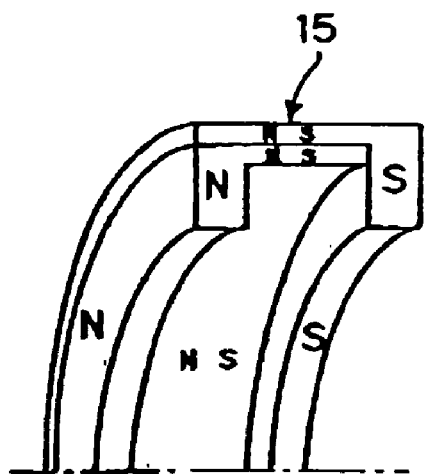
Figure 23:
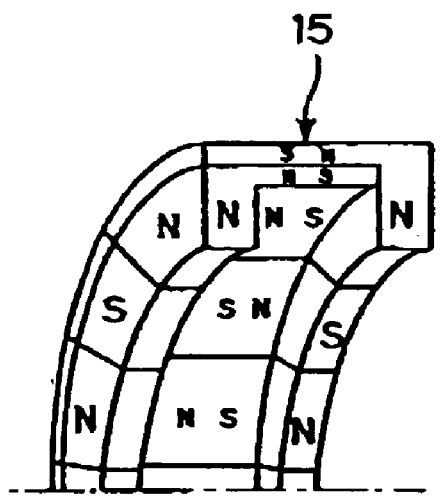
Figure 24:
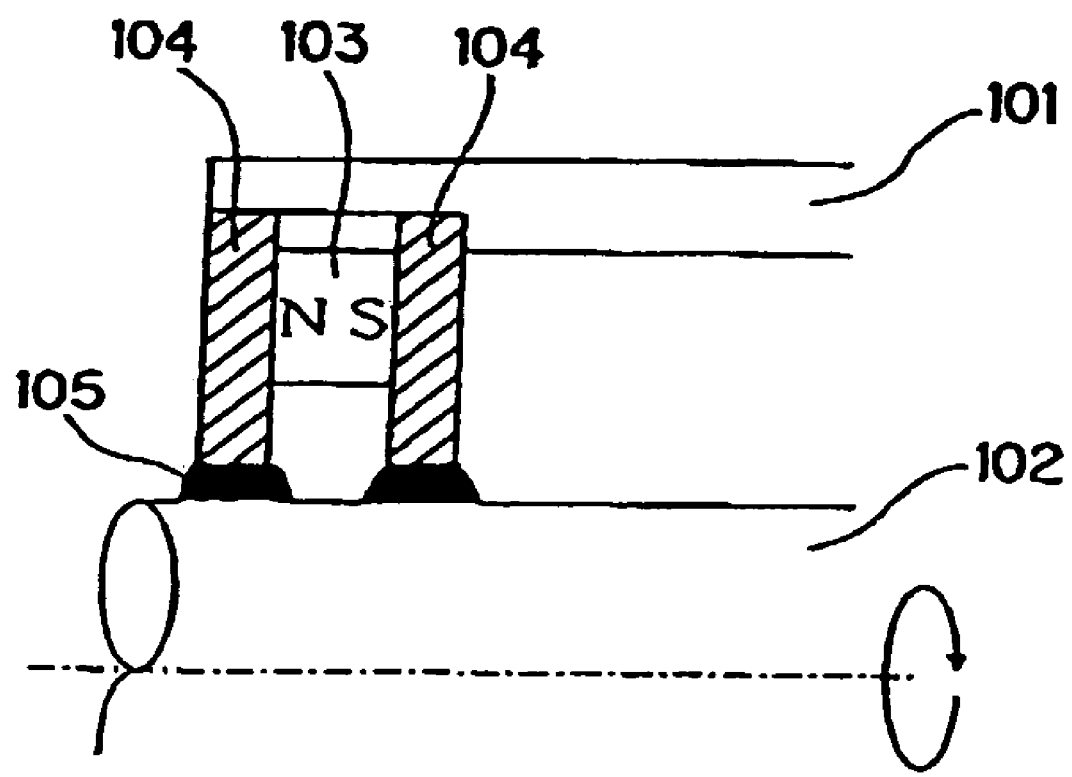
FIG. 24 is a half cross-sectional view illustrating a magnetic fluid seal device of conventional technology.

FIGS. 23 illustrate a magnetic fluid seal device in accordance with a twenty-third embodiment. The twenty-third embodiment is one in which, in the sixteenth embodiment, the sleeve-like magnets 15 and 16 are each configured by two divided cross-sectionally L-shaped members. Other configurations are the same as those of the sixteenth embodiment.

As illustrated in FIG. 23(*a*), in this embodiment, the sleeve-like magnets 15 and 16 are each configured by two cross-sectionally L-shaped members that have been divided into two. The two cross-sectionally L-shaped members comprise an axial-direction portion and a projecting portion that projects in the radial direction at the opposite end at the axial direction, and one sleeve-like magnet 15 and 16 is formed by superposing the axial-direction portions of the two cross-sectionally L-shaped members.

Here, because the cross-sectionally L-shaped members at the right side of the drawing are fitted first and then the cross-sectionally L-shaped members at the left side of the drawing are superposed thereon, the device can be easily configured by carrying out in advance the disposition of the nonmagnetic member 17 and the filling of the magnetic fluids 4 and 5 at the cross-sectionally L-shaped members at the left side of the drawing. Alternatively, the nonmagnetic member 17 can be inserted within the cross-sectionally L-shaped members at the left side of the drawing, the cross-sectionally L-shaped members at the right side of the drawing can then be superposed thereon, and the magnetic fluids 4 and 5 can be filled in, so that it can be fitted to the device in a state in which the device is assembled as a seal device.

Magnetized patterns of the sleeve-like magnet 15 in this case are respectively illustrated in FIGS. 23(*b*) and 23(*c*). FIG. 23(*b*) illustrates a unipolarly magnetized sleeve-like magnet 15, and FIG. 23(*c*) illustrates a multipolarly magnetized sleeve-like magnet 15. These sleeve-like magnets 15 include poles lined in the axial direction.

Thus, it becomes easy to dispose the nonmagnetic member 17 into the grooves of the sleeve-like magnets 15 and 16. Also, because the device can be configured even if structural parts such as the nonmagnetic member 17 and the sleeve-like magnets 15 and 16 do not have an elastic deformation characteristic, the degree of freedom with which materials can be selected is increased.

INDUSTRIAL APPLICABILITY

As described above, in the present invention, the magnetic force generating means is buoyantly supported by the magnetic fluid, and the space between the two members is sealed by the magnetic force generating means and the magnetic fluid, whereby the sum of the two gaps between each member surface of the two members and the magnetic force generating means becomes a tolerance of eccentricity of the two members and sealability can be exhibited even if the precision of coaxiality is low. Also, members such as the pole pieces that have been conventionally used become unnecessary, structural members can be reduced, which is effective for thinning of the device, and manufacturing becomes easy without the need to join members. Moreover, because the magnetic force generating means floats with a magnetic force by the magnetic fluid, the invention also exhibits a function as a rotation inertia damper using the magnetic force generating means as an inertial body and using the magnetic fluid as viscous damping means.

By disposing the sleeves that are fitted together with at least one of the two members and forming grooves in the opposing surface of the sleeve opposing the magnetic force generating means, the device can be fitted in a state in which the magnetic fluid is filled in advance between the magnetic force generating means and the sleeves, the fitting becomes easy, and management of the magnetic fluid filling amount becomes easy.

The sleeves include two cross-sectionally L-shaped members comprising the axial-direction portion and the projecting portion that projects in the radial direction from the axial-direction portion at the opposite end portion at the axial direction, and are configured by superposing the axial-direction portions of the cross-sectionally L-shaped members, whereby it becomes easy to dispose the magnetic force generating means in the grooves of the sleeves. Also, because the invention can be configured without the structural parts having elastic deformability, the degree of freedom with which materials can be selected is increased.

The oil-repellant film is formed on at least the surface portion, outside the grooves, of the opposing surfaces of the sleeves opposing the magnetic force generating means, whereby it is possible to prevent the magnetic fluid from spreading on the surfaces outside the grooves and to prevent the magnetic fluid amount used in the seal from being reduced.

The portion of the sleeves that projects in the radial direction is configured by a rubber-like elastic body, whereby it becomes easy to dispose the magnetic force generating means in the grooves of the sleeves by deforming the rubber-like elastic body.

The portion of the sleeves that fits together with the one of the members is configured by a rubber-like elastic body, whereby adhesion of both in the fitting together of the sleeve with the one of the members becomes unnecessary.

The opposing ends of the magnetic force generating means opposing the two members are pointed, and magnetic flux is concentrated at and the magnetic fluid is magnetically retained at pointed tips thereof, whereby the magnetic fluid is efficiently concentrated and retained without being dispersed, and it is thus possible to reduce the magnetic fluid filling amount.

The grooves of the sleeves are formed in a shape that matches the pointed opposing ends of the magnetic force generating means, whereby it is further possible to prevent dispersion of the magnetic fluid.

The gaps between the pointed opposing ends of the magnetic force generating means and the grooves of the sleeves narrow towards the tips of the pointed opposing ends of the magnetic force generating means, whereby it is further possible to reduce the magnetic fluid filling amount.

The pointed opposing ends of the magnetic force generating means are cross-sectionally triangular protruding shapes, whereby the magnetic flux can be concentrated at, and the magnetic fluid can be efficiently concentrated and retained at, the pointed tips thereof.

The pointed opposing ends of the magnetic force generating means are cross-sectionally arced protruding shapes, whereby the magnetic flux can be concentrated at, and the magnetic fluid can be efficiently concentrated and retained at, the pointed tips thereof.

The device includes sleeves that are fitted together with at least one of the two members, and the oil-repellant film is formed on at least both axial-direction end portions of the sleeves, whereby the device can be fitted in a state in which the magnetic fluid has been filled in advance between the magnetic force generating means and the sleeves, the fitting becomes easy, and management of the magnetic fluid filling amount becomes easy. Also, it is possible to prevent the magnetic fluid from spreading onto both axial-direction end portions of the sleeves and to prevent the magnetic fluid amount used in the seal from being reduced.

The two members are relatively reciprocally movable, and the device includes the sleeve that fits together with at least one of the two members and extends in the axial direction corresponding to the reciprocal movement length of the two members, whereby the device can be fitted in a state in which the magnetic fluid has been filled in advance between the magnetic force generating means and the sleeves, the fitting becomes easy, and management of the magnetic fluid filling amount becomes easy. Also, it is possible to make the magnetic fluid slide on the sleeve extending in the axial direction corresponding to the reciprocal movement length of the two members.

The groove corresponding to the reciprocal movement length of the two members is formed in the opposing surface of the sleeve opposing the magnetic force generating means, whereby the device can be fitted in a state in which the magnetic fluid has been filled in advance between the magnetic force generating means and the sleeves, the fitting becomes easy, and scattering of the magnetic fluid outside of the groove is prevented, so that management of the magnetic fluid filling amount becomes easy. Also, it is possible to make the magnetic fluid slide in the groove of the sleeve corresponding to the reciprocal movement length of the two members.

The oil-repellant film is formed on the opposing surface of the sleeve opposing the magnetic force generating means, whereby it is possible to prevent the magnetic fluid sliding at the time of relative reciprocal movement from spreading on the surface and to prevent the magnetic fluid amount used in the seal from being reduced.

The sleeves have an elastic deformation characteristic that enables the magnetic force generating means to be inserted into the grooves of the sleeves, whereby smooth fitting of the magnetic force generating means is possible.

The two members and the sleeves are nonmagnetic materials, whereby the magnetic fluid can be gathered at the magnetic poles of the magnetic force generating means and the magnetic force generating means can be made to float magnetically.

The groove is formed in the opposing surface of at least one member of the two members opposing the magnetic force generating means, whereby members such as sleeves and pole pieces that have been used conventionally become unnecessary, the device can be configured by only the magnetic force generating means and the magnetic fluid, structural members can be reduced, and thinning becomes largely possible.

The oil-repellant film is formed on the opposing surface of at least one member of the two members opposing the magnetic force generating means, whereby it is possible to prevent the magnetic fluid from spreading on the surface of the one member and to prevent the magnetic fluid amount used in the seal from being reduced.

The magnetic force generating means has an elastic deformation characteristic that enables the magnetic force generating means to be inserted into the grooves, whereby smooth fitting of the magnetic force generating means is possible.

The oil-repellant film is formed on the portion of the magnetic force generating means that does not contact the magnetic fluid, whereby it is possible to prevent the magnetic fluid from spreading on the surface of the magnetic force generating means and to prevent the magnetic fluid amount used in the seal from being reduced.

The cutout portion is formed in the portion of the magnetic force generating means that does not contact the magnetic fluid, whereby weight reduction of the magnetic force generating means is improved, and it is possible to make the magnetic force generating means float more reliably.

The cutout portion is formed in the side surface of the magnetic force generating means extending between the two members, whereby weight reduction of the magnetic force generating means is improved, and it possible to make the magnetic force generating means float more reliably.

The cutout portions are formed in center portions of opposing end surfaces of the magnetic force generating means opposing the two members, whereby weight reduction of the magnetic force generating means is improved, and it is possible to make the magnetic force generating means float more reliably.

The magnetic force generating means is a magnet that is unipolarly or multipolarly magnetized in the axial direction or the radial direction, whereby the magnet and the magnetic fluid fill the space between the two members and can seal the two members.

Also, in the invention, the nonmagnetic member is buoyantly supported by the magnetic fluid, and the space between the two members is sealed by the nonmagnetic member and the magnetic fluid, whereby the sum of the two gaps between each member surface of the two members and the nonmagnetic member becomes a tolerance of eccentricity of the two members, and the invention can exhibit sealability even if the precision of the coaxiality is low. Also, members such as the pole pieces that have been conventionally used become unnecessary, structural members can be reduced, which is effective for thinning of the device, and manufacturing becomes easy without the need to join members. Moreover, because the nonmagnetic member floats with a magnetic force by the magnetic fluid, the invention also exhibits a function as a rotation inertia damper using the nonmagnetic member as an inertial body and using the magnetic fluid as viscous damping means. In particular, because the nonmagnetic member can be made thin and light without changing the magnetic force, the nonmagnetic member can be made to float magnetically even if the diameter of the device is increased.

The groove is formed in the opposing surface of at least one of the sleeve-like magnetic force generating means opposing the nonmagnetic member, whereby the device can be fitted in a state in which the magnetic fluid has been filled in advance between the sleeve-like magnetic force generating means and the nonmagnetic member, the fitting becomes easy, and management of the magnetic fluid filling amount becomes easy.

The sleeve-like magnetic force generating means include two cross-sectionally L-shaped members comprising the axial-direction portion and the projecting portion that projects in the radial direction from the axial-direction portion at the opposite end portion at the axial direction, and the sleeve-like magnetic force generating means are configured by superposing the axial-direction portions of the cross-sectionally L-shaped members, whereby it becomes easy to dispose the nonmagnetic member in the grooves of the sleeve-like magnetic force generating means. Also, because the invention can be configured without structural parts having elastic deformability, the degree of freedom with which materials can be selected is increased.

The oil-repellant film is formed on at least the surface portion, outside the groove, of the opposing surface of the sleeve-like magnetic force generating means opposing the nonmagnetic member, whereby it is possible to prevent the magnetic fluid from spreading on the surface outside the groove and to prevent the magnetic fluid amount used in the seal from being reduced.

The oil-repellant film is formed on at least both axial-direction end portions of the sleeve-like magnetic force generating means, whereby the device can be fitted in a state in which the magnetic fluid has been filled in advance between the sleeve-like magnetic force generating means and the nonmagnetic member, the fitting becomes easy, and management of the magnetic fluid filling amount becomes easy. Also, it is possible to prevent the magnetic fluid from spreading on both axial-direction end portions of the sleeve-like magnetic force generating means and to prevent the magnetic fluid amount used in the seal from being reduced.

The two members are relatively reciprocally movable, and the sleeve-like magnetic force generating means fitted together with at least one member of the two members is extended in the axial direction corresponding to the reciprocal movement length of the two members, whereby the device can be fitted in a state in which the magnetic fluid has been filled in advance between the sleeve-like magnetic force generating means and the nonmagnetic member, the fitting becomes easy, and management of the magnetic fluid filling amount becomes easy. Also, the magnetic fluid can be retained on the sleeve-like magnetic force generating means extending in the axial direction corresponding to the reciprocal movement length of the two members.

The groove corresponding to the reciprocal movement length of the two members is formed in the opposing surface of the sleeve-like magnetic force generating means opposing the nonmagnetic member, whereby the device can be fitted in a state in which the magnetic fluid has been filled in advance between the sleeve-like magnetic force generating means and the nonmagnetic member, the fitting becomes easy, and scattering of the magnetic fluid outside of the groove is prevented, so that management of the magnetic fluid filling amount becomes easy. Also, the magnetic fluid can be retained in the groove of the sleeve-like magnetic force generating means corresponding to the reciprocal movement length of the two members.

The sleeve-like magnetic force generating means have an elastic deformation characteristic that enables the nonmagnetic member to be inserted into the grooves of the sleeve-like magnetic force generating means, whereby smooth fitting of the nonmagnetic member is possible.

The nonmagnetic member has an elastic deformation characteristic that enables the nonmagnetic member to be inserted into the grooves of the sleeve-like magnetic force generating means, whereby smooth fitting of the nonmagnetic member is possible.

The oil-repellant film is formed on the portion of the nonmagnetic member that does not contact the magnetic fluid, whereby it is possible to prevent the magnetic fluid from spreading on the surface of the nonmagnetic member and to prevent the magnetic fluid amount used in the seal from being reduced.

The cutout portion is formed in the portion of the nonmagnetic member that does not contact the magnetic fluid, whereby weight reduction of the nonmagnetic member is improved and it is possible to make the nonmagnetic member float more reliably.

The cutout portion is formed in the side surface of the nonmagnetic member extending between the two members, whereby weight reduction of the nonmagnetic member is improved and it is possible to make the nonmagnetic member float more reliably.

The cutout portions are formed in center portions of opposing end surfaces of the nonmagnetic member opposing the two members, whereby weight reduction of the nonmagnetic member is improved and it is possible to make the nonmagnetic member float more reliably.

The sleeve-like magnetic force generating means is a magnet that is unipolarly or multipolarly magnetized in the axial direction or the radial direction, whereby the magnet is fitted to the two members and the magnetic fluid can be retained.

The invention claimed is:

1. A magnetic fluid seal device that seals a space between two members that are assembled so as to be mutually relatively movable, the magnetic fluid seal device comprising:

magnetic force generating means that is disposed between the two members and generates a magnetic force;

a magnetic fluid that is magnetically retained at opposing ends of the magnetic force generating means opposing the two members and that seals two gaps between the magnetic force generating means and each member surface of the two members; and sleeves that are fitted together with at least one member of the two members, a groove formed in opposing surfaces of the sleeves oposing the magnetic force generating means, and the magnetic force generating means being buoyantly supported by the magnetic fluid, and the space between the two members being sealed by the magnetic force generating means and the magnetic fluid.

2. The magnetic fluid seal device as in claim 1, wherein the sleeves include two cross-sectionally L-shaped members comprising an axial-direction portion and a projecting portion that projects in a radial direction from the axial-direction portion at an opposite end portion at the axial direction, the sleeves being configured by superposing the axial-direction portions of the cross-sectionally L-shaped members.

3. The magnetic fluid seal device as in claim 1, wherein an oil-repellant film is formed on at least a surface portion, outside the groove, of the opposing surfaces of the sleeves opposing the magnetic force generating means.

4. The magnetic fluid seal device as in claim 1, wherein a portion of the sleeves that projects in a radial direction is configured by a rubber-like elastic body.

5. The magnetic fluid seal device as in claim 1, wherein a portion of the sleeves that fits together with the one of the members is configured by a rubber-like elastic body.

6. The magnetic fluid seal device as in claim 1, wherein the opposing ends of the magnetic force generating means opposing the two members are pointed, and magnetic flux is concentrated at and the magnetic fluid is magnetically retained at pointed tips thereof.

7. The magnetic fluid seal device as in claim 6, wherein the grooves of the sleeves are formed in a shape that matches the pointed opposing ends of the magnetic force generating means.

8. The magnetic fluid seal device as in claim 7, wherein the gaps between the pointed opposing ends of the magnetic force generating means and the grooves of the sleeves narrow towards the tips of the pointed opposing ends of the magnetic force generating means.

9. The magnetic fluid seal device as in claim 6, wherein the pointed opposing ends of the magnetic force generating means are cross-sectionally triangular protruding shapes.

10. The magnetic fluid seal device as in claim 6, wherein the pointed opposing ends of the magnetic force generating means are cross-sectionally arced protruding shapes.

11. The magnetic fluid seal device as in claim 1, wherein an oil-repellant film is formed on at least both axial-direction end portions of the sleeves.

12. The magnetic fluid seal device as in claim 1, wherein the two members are relatively reciprocally movable, and wherein the sleeves fit together with at least one of the two members and extends in an axial direction corresponding to a reciprocal movement length of the two members.

13. The magnetic fluid seal device as in claim 12, wherein a groove corresponding to the reciprocal movement length of the two members is formed in an opposing surface of the sleeve opposing the magnetic force generating means.

14. The magnetic fluid seal device as in claim 12, wherein an oil-repellant film is formed on the opposing surface of the sleeve opposing the magnetic force generating means.

15. The magnetic fluid seal device as in claim 1, wherein at least one of the sleeves and the magnetic fluid seal device have an elastic deformation characteristic that enables the magnetic force generating means to be inserted into the grooves of the sleeves.

16. The magnetic fluid seal device as in claim 1, wherein the two members and the sleeves are nonmagnetic materials.

17. The magnetic fluid seal device as in claim 1, wherein an oil-repellant film is formed on an opposing surface of at least one member of the two members opposing the magnetic force generating means.

18. The magnetic fluid seal device as in any one of claim 1, wherein an oil-repellant film is formed on a portion of the magnetic force generating means that does not contact the magnetic fluid.

19. The magnetic fluid seal device as in claim 1, wherein a cutout portion is formed in a portion of the magnetic force generating means that does not contact the magnetic fluid.

20. The magnetic fluid seal device as in claim 19, wherein a cutout portion is formed in a side surface of the magnetic force generating means extending between the two members.

21. The magnetic fluid seal device as in claim 19, wherein cutout portions are formed in center portions of opposing end surfaces of the magnetic force generating means opposing the two members.

22. The magnetic fluid seal device as in claim 1, wherein the magnetic force generating means is a magnet that is unipolarly or multipolarly magnetized in the axial direction or the radial direction.

23. A magnetic fluid seal device that seals a space between two members that are assembled so as to be mutually relatively movable, the magnetic fluid seal device characterized by including:

sleeve-like magnetic force generating means that are respectively fitted together with the two members and generate a magnetic force;

a nonmagnetic member that is disposed between the sleeve-like magnetic force generating means; and magnetic fluid that is magnetically retained at opposing surfaces of the sleeve-like magnetic force generating means opposing the nonmagnetic member and that seals two gaps between the sleeve-like magnetic force generating means and the nonmagnetic member, wherein the nonmagnetic member is buoyantly supported by the magnetic fluid, and the space between the two members is sealed by the nonmagnetic member and the magnetic fluid.

24. The magnetic fluid seal device as in claim 23, wherein a groove is formed in an opposing surface of at least one of the sleeve-like magnetic force generating means opposing the nonmagnetic member.

25. The magnetic fluid seal device as in claim 24, wherein the sleeve-like magnetic force generating means include two cross-sectionally L-shaped members comprising an axial-direction portion and a projecting portion that projects in a radial direction from the axial-direction portion at an opposite end portion at the axial direction, the sleeve-like magnetic force generating means being configured by superposing the axial-direction portions of the cross-sectionally L-shaped members.

26. The magnetic fluid seal device as in claim 24, wherein an oil-repellant film is formed on at least a surface portion, outside the groove, of the opposing surface of the sleeve-like magnetic force generating means opposing the nonmagnetic member.

27. The magnetic fluid seal device as in claim 24, wherein the sleeve-like magnetic force generating means have an elastic deformation characteristic that enables the nonmagnetic member to be inserted into the grooves of the sleeve-like magnetic force generating means.

28. The magnetic fluid seal device as in claim 24, wherein the nonmagnetic member has an elastic deformation characteristic that enables the nonmagnetic member to be inserted into the grooves of the sleeve-like magnetic force generating means.

29. The magnetic fluid seal device as in claim 23, wherein an oil-repellant film is formed on at least both axial-direction end portions of the sleeve-like magnetic force generating means.

30. The magnetic fluid seal device as in claim 23, wherein the two members are relatively reciprocally movable, and the sleeve-like magnetic force generating means fitted together with at least one member of the two members is extended in an axial direction corresponding to a reciprocal movement length of the two members.

31. The magnetic fluid seal device as in claim 30, wherein a groove corresponding to the reciprocal movement length of the two members is formed in an opposing surface of the sleeve-like magnetic force generating means opposing the nonmagnetic member.

32. The magnetic fluid seal device as in claim 23, wherein an oil-repellant film is formed on a portion of the nonmagnetic member that does not contact the magnetic fluid.

33. The magnetic fluid seal device as in claims 23, wherein a cutout portion is formed in a portion of the nonmagnetic member that does not contact the magnetic fluid.

34. The magnetic fluid seal device as in claim 33, wherein a cutout portion is formed in a side surface of the nonmagnetic member extending between the two members.

35. The magnetic fluid seal device as in claim 33, wherein cutout portions are formed in center portions of opposing end surfaces of the nonmagnetic member opposing the two members.

36. The magnetic fluid seal device as in claim 23, wherein the sleeve-like magnetic force generating means is a magnet that is unipolarly or multipolarly magnetized in the axial direction or the radial direction.

* * * * *